US012218464B2

(12) United States Patent
Nakamura

(10) Patent No.: US 12,218,464 B2
(45) Date of Patent: Feb. 4, 2025

(54) CONNECTOR ASSEMBLY HAVING A MATING CONNECTOR AND A CONNECTOR CONFIGURED TO BE MOUNTED ON AN OBJECT WHEREIN AN ABUTMENT PORTION OF A SUPPORTING PORTION OF A TERMINAL OF THE CONNECTOR IS IN CONTACT WITH A RECEIVING PORTION OF A COUPLING PORTION OF THE TERMINAL UNDER A MATED STATE

(71) Applicant: Japan Aviation Electronics Industry, Limited, Tokyo (JP)

(72) Inventor: Keisuke Nakamura, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 440 days.

(21) Appl. No.: 17/731,336

(22) Filed: Apr. 28, 2022

(65) Prior Publication Data

US 2022/0385004 A1 Dec. 1, 2022

(30) Foreign Application Priority Data

Jun. 1, 2021 (JP) ................................ 2021-092054

(51) Int. Cl.
*H01R 13/73* (2006.01)
*H01R 13/24* (2006.01)
(Continued)

(52) U.S. Cl.
CPC ............. *H01R 13/73* (2013.01); *H01R 13/24* (2013.01); *H01R 13/405* (2013.01); *H01R 13/64* (2013.01)

(58) Field of Classification Search
CPC .............................. H01R 12/716; H01R 12/73
See application file for complete search history.

(56) References Cited

U.S. PATENT DOCUMENTS 5,695,353 A 12/1997 Sakata et al.
7,387,541 B1 6/2008 Lai et al.
(Continued)

FOREIGN PATENT DOCUMENTS

JP H08-162226 A 6/1996
JP 2006-269418 A 10/2006
(Continued)

OTHER PUBLICATIONS

Extended European Search Report in EP 22172334.9-1201, dated Oct. 19, 2022.

*Primary Examiner* — Michael C Zarroli
(74) *Attorney, Agent, or Firm* — Collard & Roe, P.C.

(57) ABSTRACT

A connector assembly comprises a mating connector and a connector which is configured to be mounted on an object. The mating connector is mateable from above with the connector which is positioned below the mating connector in an up-down direction. The connector comprises a housing and a terminal. The terminal has a fixed portion, a held portion, a coupling portion, a supporting portion and a contact point. The coupling portion couples the fixed portion and the held portion with each other. The coupling portion has a receiving portion. The supporting portion extends from the held portion and is resiliently deformable. The supporting portion has an abutment portion. The abutment portion is positioned above the receiving portion in the up-down direction. The abutment portion is in contact with the receiving portion under a mated state where the connector and the mating connector are mated with each other.

6 Claims, 18 Drawing Sheets

(51) Int. Cl.

| | |
|---|---|
| ***H01R 13/405*** | (2006.01) |
| ***H01R 13/64*** | (2006.01) |

(56) References Cited

U.S. PATENT DOCUMENTS

| | | | | |
|---|---|---|---|---|
| 9,728,873 | B2 | 8/2017 | Komoto et al. | |
| 2022/0320770 | A1* | 10/2022 | Komoto ............ | H01R 13/6315 |

FOREIGN PATENT DOCUMENTS

| | | | |
|---|---|---|---|
| JP | 2009-37970 | A | 2/2009 |
| JP | 2017-084736 | A | 5/2017 |

* cited by examiner

CONNECTOR ASSEMBLY HAVING A MATING CONNECTOR AND A CONNECTOR CONFIGURED TO BE MOUNTED ON AN OBJECT WHEREIN AN ABUTMENT PORTION OF A SUPPORTING PORTION OF A TERMINAL OF THE CONNECTOR IS IN CONTACT WITH A RECEIVING PORTION OF A COUPLING PORTION OF THE TERMINAL UNDER A MATED STATE

CROSS REFERENCE TO RELATED APPLICATIONS

This application is based on and claims priority under 35 U.S.C. § 119 to Japanese Patent Application No. JP2021-092054 filed Jun. 1, 2021, the contents of which are incorporated herein in their entirety by reference.

BACKGROUND OF THE INVENTION

This invention relates to a connector assembly comprising a mating connector and a connector which is configured to be mounted on an object.

JPA2017-84736 (Patent Document 1) discloses a connector assembly 900 of this type. As shown in FIG. 33, the connector assembly 900 comprises a connector 910 and a mating connector 950. The mating connector 950 is mateable from a positive Z-side of the connector 910 with the connector 910 which is positioned beyond the mating connector 950 in a negative Z-direction. The mating connector 950 comprises a mating housing 952 and mating terminals 954. The mating housing 952 holds the mating terminals 954. As shown in FIG. 34, the connector 910 comprises a housing 920 and terminals 930. The housing 920 holds the terminals 930. As shown in FIG. 35, each of the terminals 930 has a fixed portion 932, a held portion 934, a supporting portion 936 and a contact point 938. The fixed portion 932 is configured to be fixed on an object (not shown). The held portion 934 is held by the housing 920. The supporting portion 936 extends from the held portion 934 and is resiliently deformable. The contact point 938 is supported by the supporting portion 936. The contact point 938 is brought into contact with the mating terminal 954 under a mated state where the connector 910 and the mating connector 950 are mated with each other.

In the connector 910 of the connector assembly 900 of Patent Document 1, a negative Z-side of the supporting portion 936 of the terminal 930 is not covered with the housing 920. Accordingly, when the connector 910 is mounted on an object, the supporting portion 936 of the terminal 930 and the object face each other in a Z-direction. Due to manufacturing variation of the housing 920 in each connector 910 or to variation in assembly of each connector 910, there occurs a difference among the connectors 910 in a distance between the supporting portion 936 of the terminal 930 and the object when the connector 910 is mounted on the object. Accordingly, the connector 910 might be different from other connectors 910 in presence or absence of contact of the supporting portion 936 of the terminal 930 with the object upon the mating of the mating connector 950 with the connector 910 mounted on the object. Additionally, a timing of the contact of the supporting portion 936 of the terminal 930 of each connector 910 with the object might be different from those of other connectors 910 even among the connectors 910 in each of which the supporting portion 936 of the terminal 930 is brought into contact with the object upon the mating of the mating connector 950 with the connector 910 mounted on the object. In other words, each connector 910 exhibits a variation in movement of the terminal 930 upon the mating of the mating connector 950 with the connector 910 mounted on the object.

SUMMARY OF THE INVENTION

It is therefore an object of the present invention to provide a connector assembly which exhibits no variation in movement of a terminal of a connector when the connector and a mating connector are mated with each other.

One aspect of the present invention provides a connector assembly comprising a mating connector and a connector which is configured to be mounted on an object. The mating connector is mateable from above with the connector which is positioned below the mating connector in an up-down direction. The mating connector comprises a mating housing and a mating terminal. The mating housing holds the mating terminal. The connector comprises a housing and a terminal. The housing holds the terminal. The terminal has a fixed portion, a held portion, a coupling portion, a supporting portion and a contact point. The fixed portion is configured to be fixed to the object. The held portion is held by the housing. The coupling portion couples the fixed portion and the held portion with each other. The coupling portion has a receiving portion. The supporting portion extends from the held portion and is resiliently deformable. The supporting portion has an abutment portion. The abutment portion is positioned above the receiving portion in the up-down direction. The abutment portion is in contact with the receiving portion under a mated state where the connector and the mating connector are mated with each other. The contact point is supported by the supporting portion. The contact point is brought into contact with the mating terminal under the mated state.

The connector assembly of the present invention is configured as follows: the terminal of the connector has the coupling portion and the supporting portion; the coupling portion has the receiving portion; the supporting portion has the abutment portion; and the abutment portion is in contact with the receiving portion under the mated state where the connector and the mating connector are mated with each other. Accordingly, the connector assembly of the present invention exhibits no variation in movement of the terminal of the connector when the connector and the mating connector are mated with each other. Since the present invention has the aforementioned advantage, the present invention is applicable to a connector assembly comprising a so-called drop-in connector.

An appreciation of the objectives of the present invention and a more complete understanding of its structure may be had by studying the following description of the preferred embodiment and by referring to the accompanying drawings.

Figure 1:
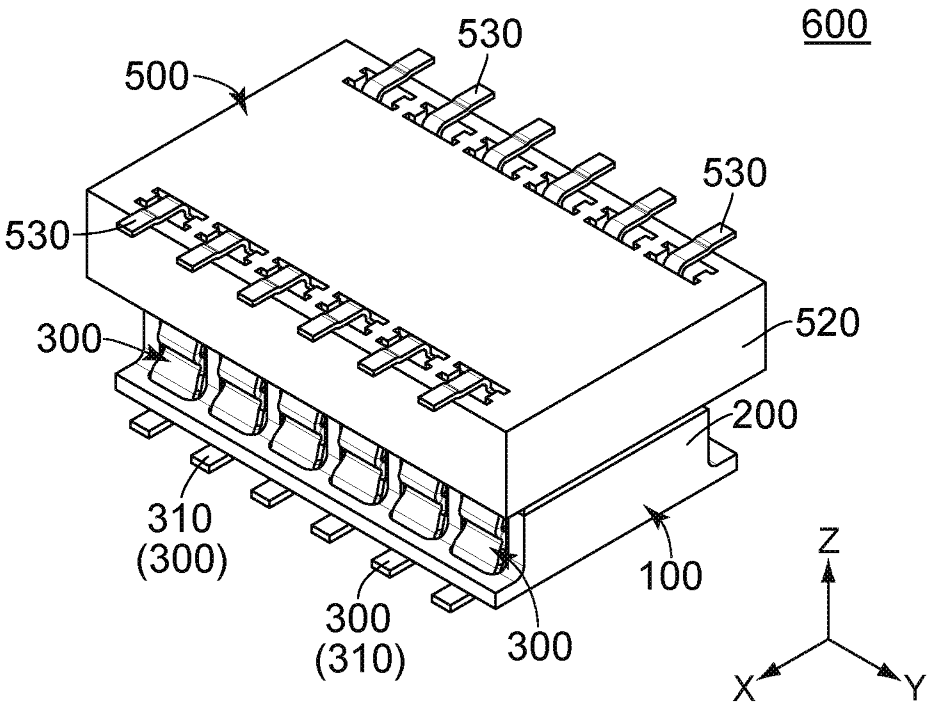
FIG. 1 is an upper, perspective view showing a connector assembly according to a first embodiment of the present invention. In the figure, a connector and a mating connector are in an unmated state where the connector and the mating connector are not mated with each other.
Figure 2:
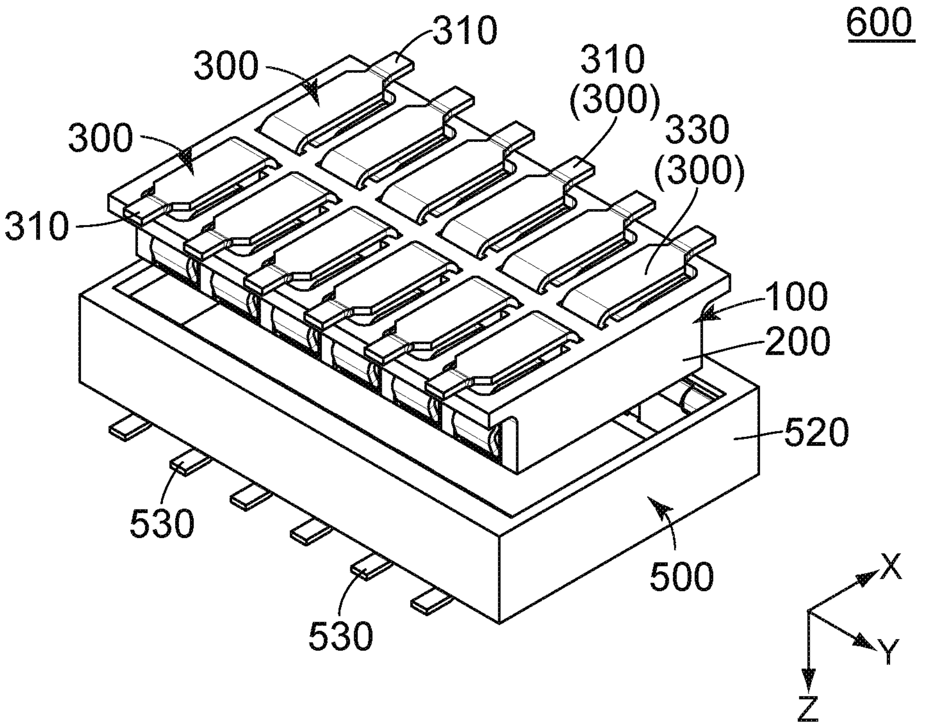
FIG. 2 is a lower, perspective view showing the connector assembly of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

Figure 12:
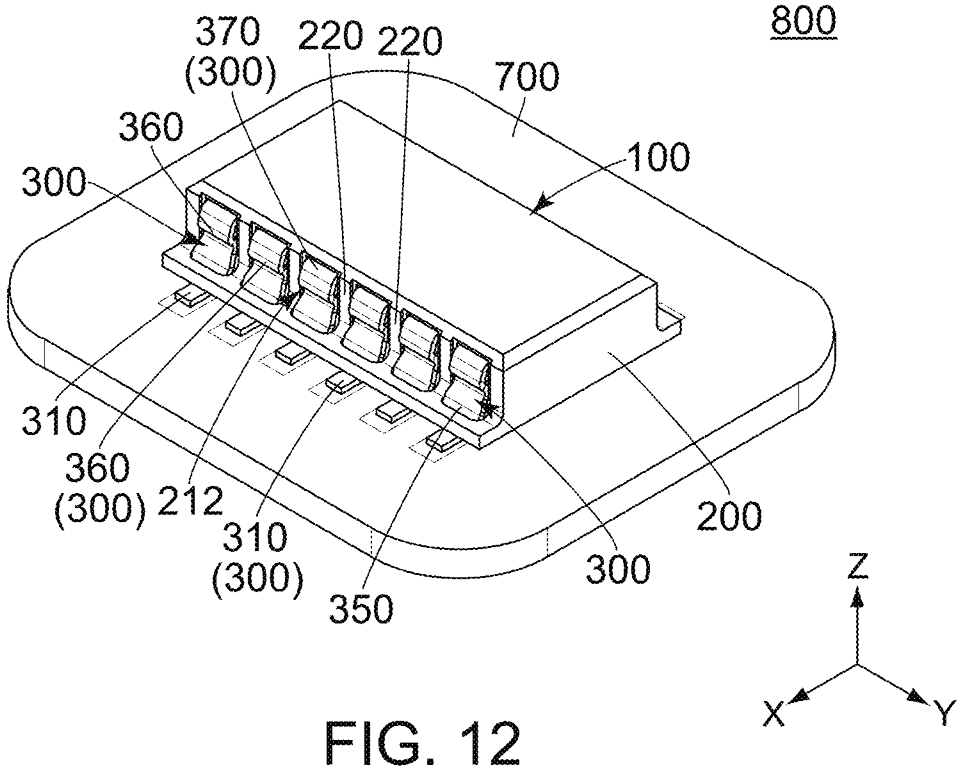
FIG. 12 is a perspective view showing an electronic equipment which consists of an object and a connector which is included in the connector assembly of FIG. 1. In the figure, the connector is mounted on the object.
Figure 13:
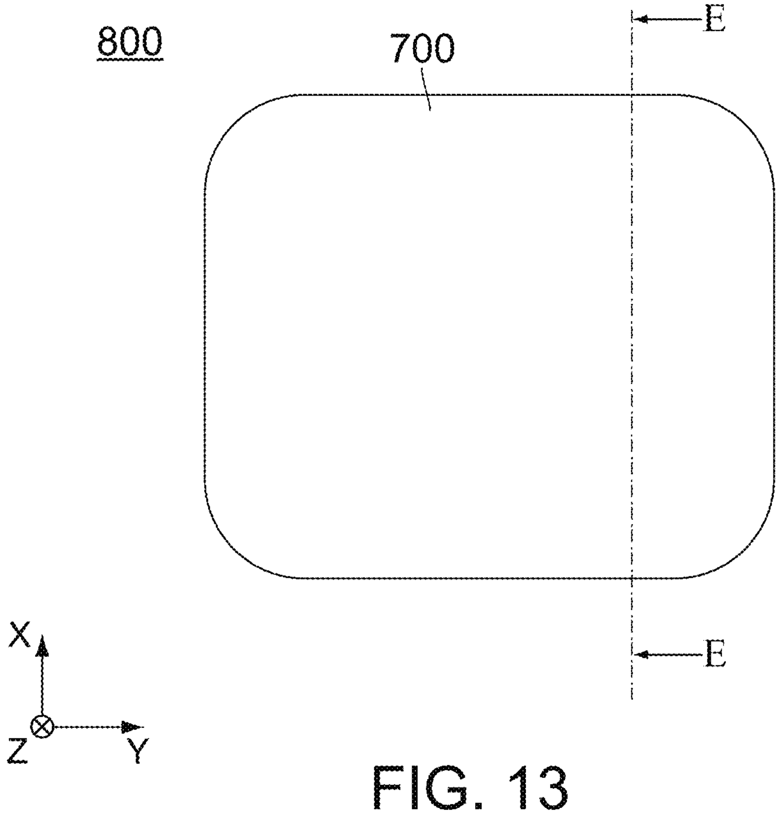
FIG. 13 is a bottom view showing the electronic equipment of FIG. 12.

As shown in FIGS. 1 and 12, a connector assembly 600 according to a first embodiment of the present invention comprises a mating connector 500 and a connector 100 which is configured to be mounted on an object 700. The object 700 of the present embodiment is a circuit board. The connector 100 and the object 700 form an electronic equipment 800.

Figure 4:
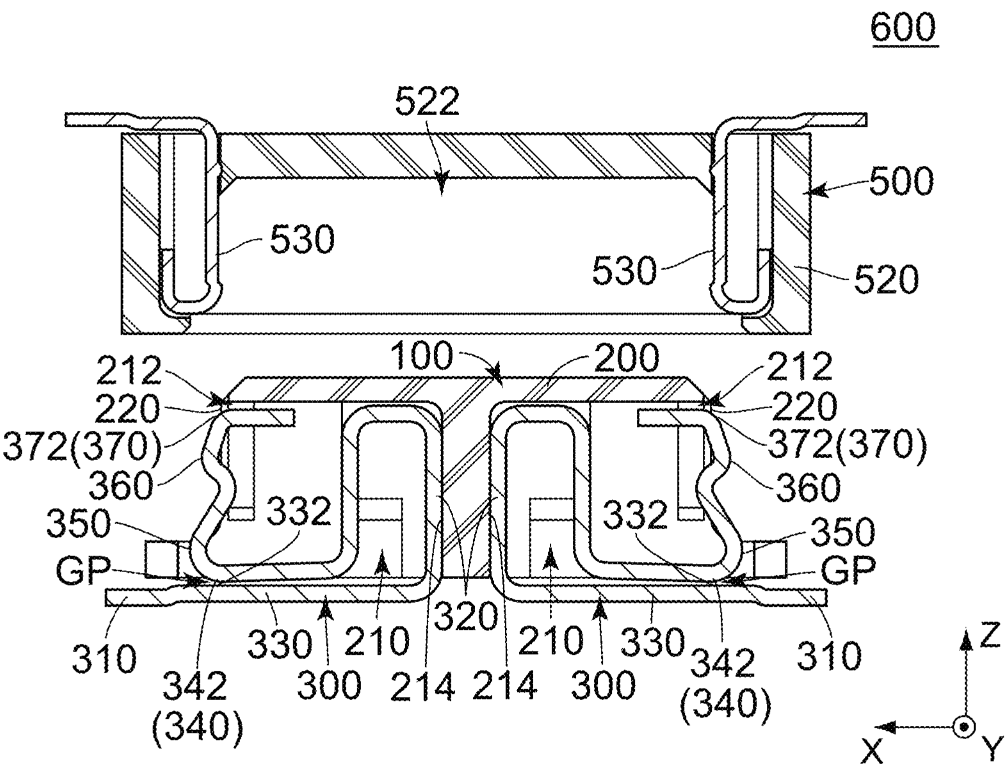
FIG. 4 is a cross-sectional view showing the connector assembly of FIG. 3, taken along line A-A.
Figure 5:
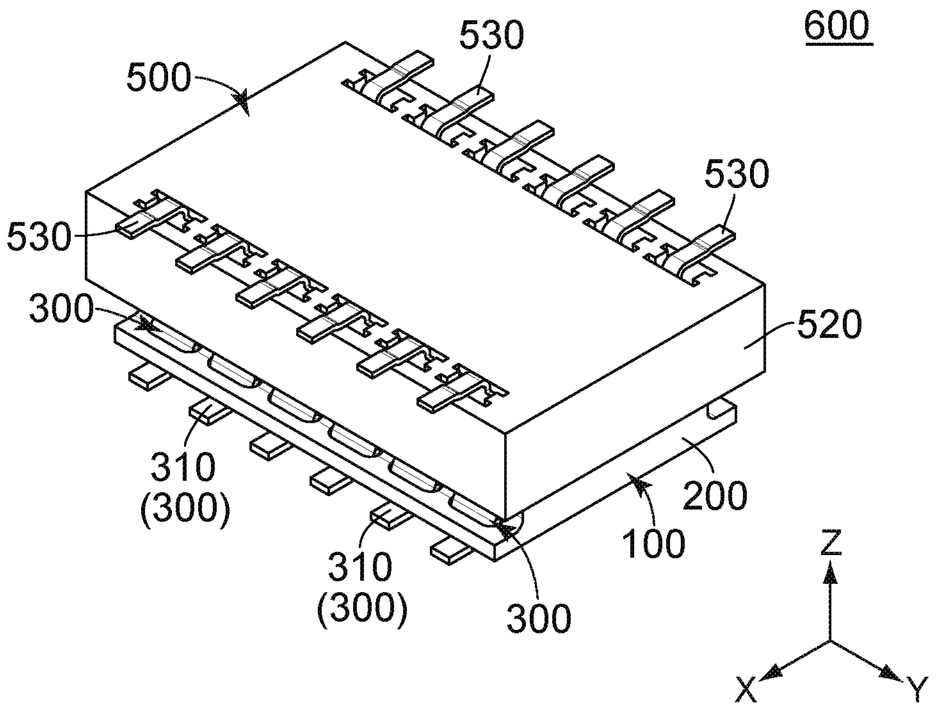
FIG. 5 is an upper, perspective view showing the connector assembly of FIG. 1. In the figure, the connector and the mating connector are in a specific contact state.
Figure 6:
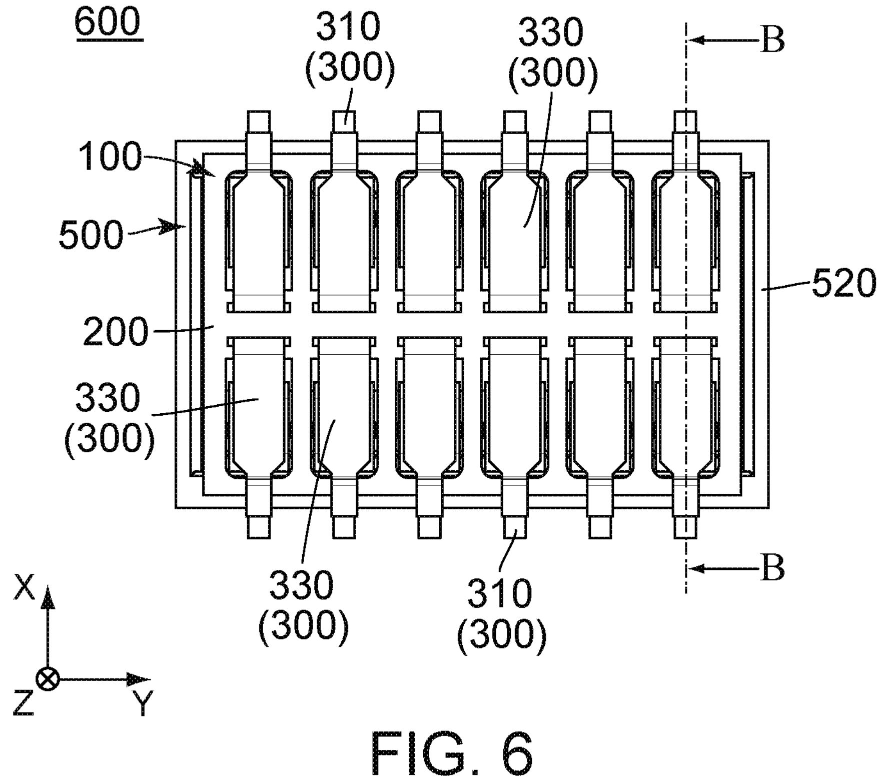
FIG. 6 is a bottom view showing the connector assembly of FIG. 5.
Figure 11:
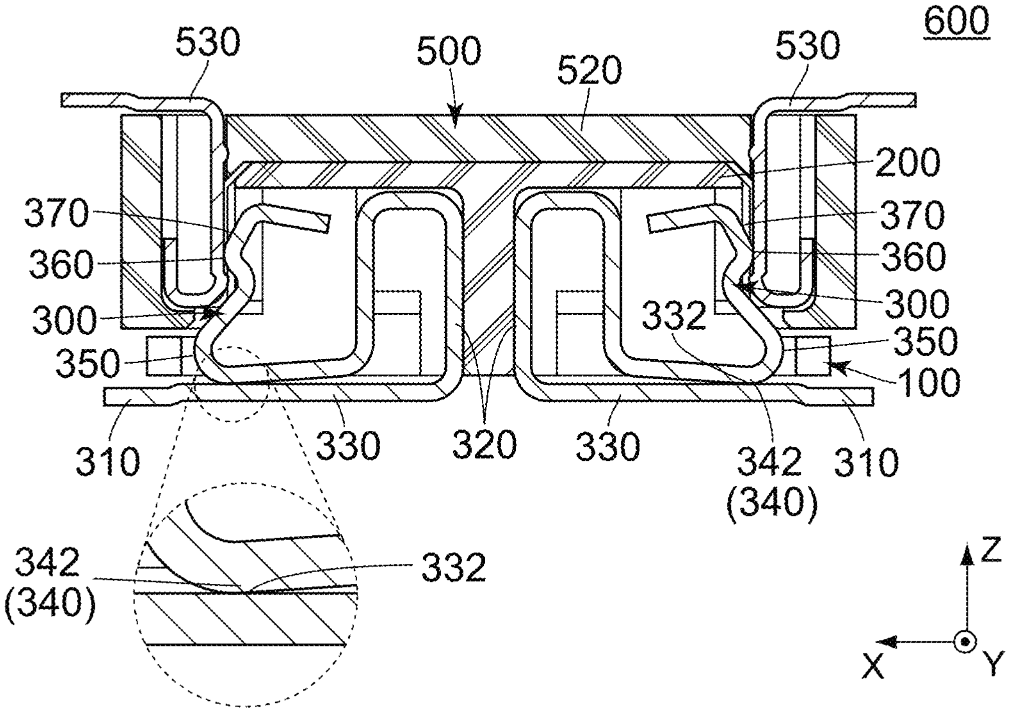
FIG. 11 is a cross-sectional view showing the connector assembly of FIG. 10, taken along line D-D.

Referring to FIGS. 4 and 11, the mating connector 500 of the present embodiment is mateable from above with the connector 100 which is positioned below the mating connector 500 in an up-down direction. In the present embodiment, the up-down direction is a Z-direction. Specifically, upward is a positive Z-direction while downward is a negative Z-direction. The mating connector 500 comprises a mating housing 520 and a plurality of mating terminals 530. However, the present invention is not limited thereto. Specifically, the number of the mating terminal 530 may be one.

Referring to FIG. 4, the mating housing 520 of the present embodiment is made of insulator. The mating housing 520 holds the mating terminals 530. The mating housing 520 has an accommodating portion 522.

As shown in FIG. 4, the accommodating portion 522 of the present embodiment is a recess which is recessed upward in the up-down direction.

Referring to FIG. 4, each of the mating terminals 530 of the present embodiment is made of metal. As shown in FIG. 1, the mating terminals 530 are arranged in two rows in a first horizontal direction. In the present embodiment, the first horizontal direction is an X-direction. The first horizontal direction is also referred to as a front-rear direction. Specifically, it is assumed that forward is a positive X-direction while rearward is a negative X-direction. The mating terminals 530 of each row are arranged in a second horizontal direction. In the present embodiment, the second horizontal direction is a Y-direction. As shown in FIG. 4, a part of each of the mating terminals 530 is exposed in the accommodating portion 522.

As shown in FIG. 12, the connector 100 of the present embodiment comprises a housing 200 and a plurality of terminals 300. However, the present invention is not limited thereto. Specifically, the number of the terminal 300 may be one.

Figure 14:
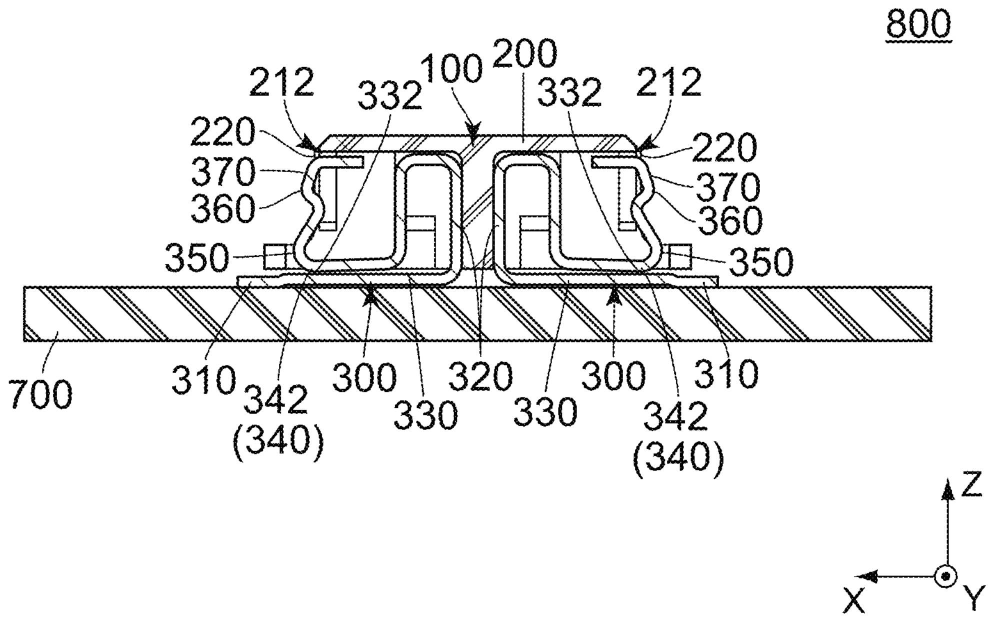
FIG. 14 is a cross-sectional view showing the electronic equipment of FIG. 13, taken along line E-E.

Referring to FIG. 14, the housing 200 of the present embodiment is made of insulator. The housing 200 holds the terminals 300. As understood from FIGS. 4 and 11, a part of the housing 200 is accommodated in the accommodating portion 522 of the mating connector 500 when the connector 100 and the mating connector 500 are mated with each other. As shown in FIGS. 4 and 12, the housing 200 has a plurality of terminal accommodating portions 210 and a plurality of connection guiding surfaces 220. However, the present invention is not limited thereto. Specifically, the number of the connection guiding surfaces 220 may be two.

As shown in FIG. 4, each of the terminal accommodating portions 210 of the present embodiment opens downward in the up-down direction. Each of the terminal accommodating portions 210 opens outward in the first horizontal direction. Specifically, each of the terminal accommodating portions 210 has an opening 212 which is positioned at its outer end in the first horizontal direction. Each of terminal accommodating portions 210 has a holding portion 214. In other words, the housing 200 has a plurality of the holding portions 214.

Referring to FIG. 4, the holding portion 214 of the present embodiment is a set of ditches which are positioned at opposite ends, respective, of the terminal accommodating portion 210 in the second horizontal direction.

As shown in FIG. 12, each of the connection guiding surfaces 220 of the present embodiment extends in a plane which is defined by the up-down direction and the second horizontal direction. Each of the connection guiding surfaces 220 is perpendicular to the first horizontal direction. Two of the connection guiding surfaces 220 are positioned at opposite sides, respectively, of the opening 212 in the second horizontal direction.

Figure 3:
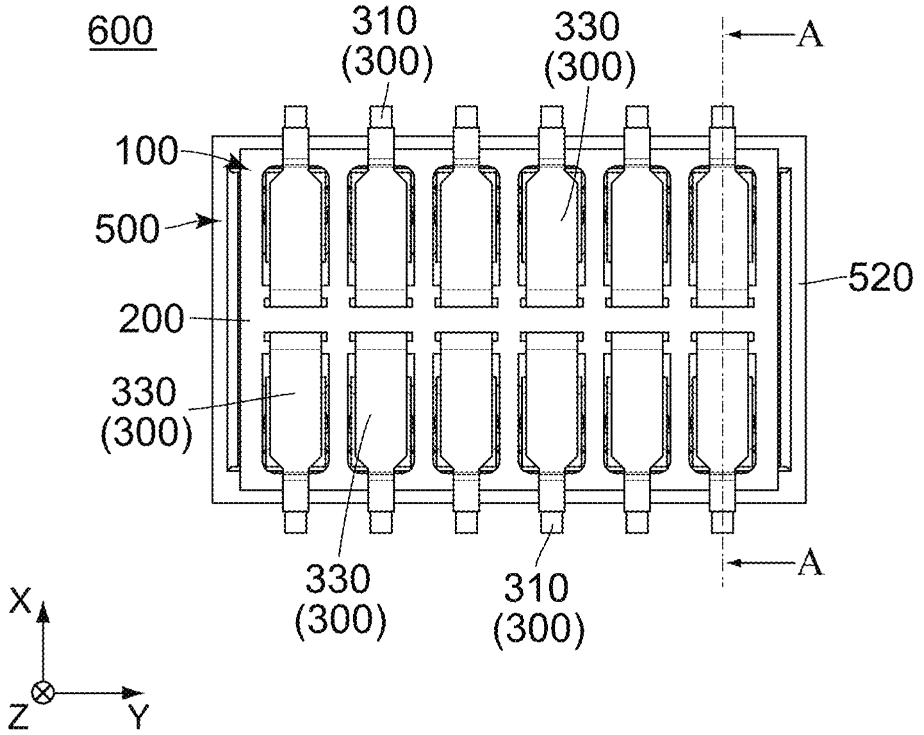
FIG. 3 is a bottom view showing the connector assembly of FIG. 2.
Figure 15:
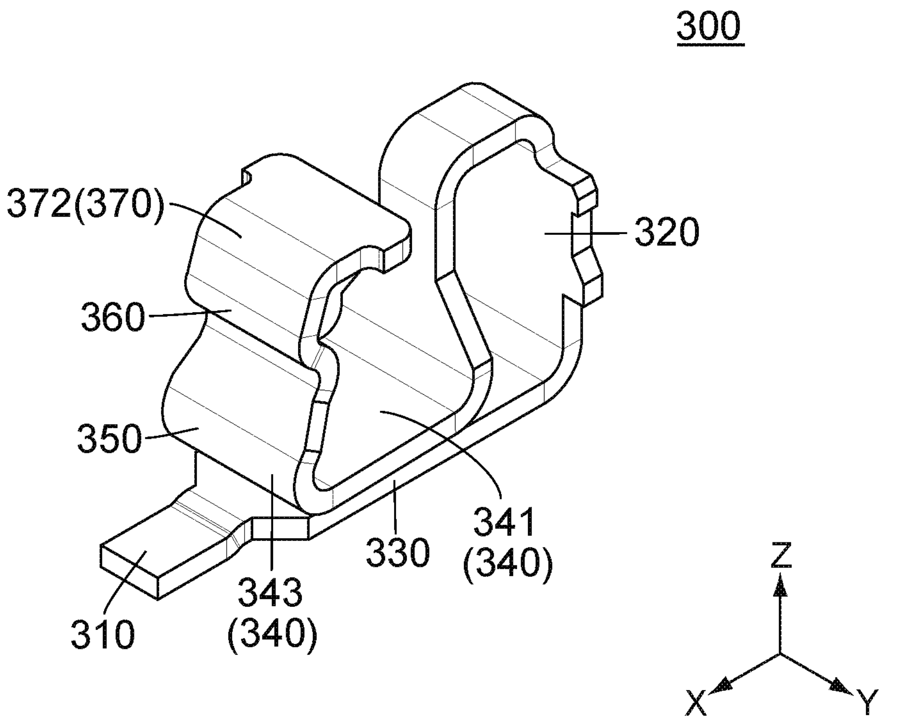
FIG. 15 is a perspective view showing a terminal of a front row which is included in the connector of FIG. 12.
Figure 16:
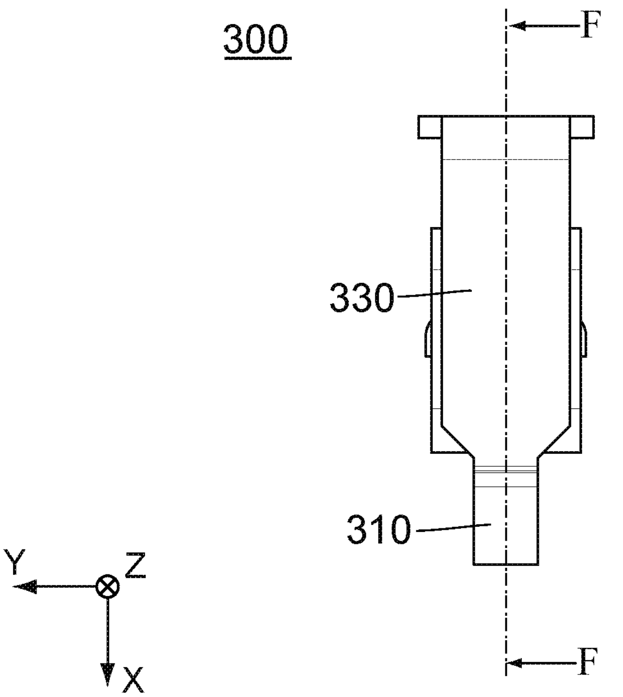
FIG. 16 is a bottom view showing the terminal of FIG. 15.

Referring to FIG. 15, the terminals 300 of the present embodiment is made of metal. As shown in FIG. 4, the terminals 300 are held by the housing 200. As shown in FIG. 3, the terminals 300 are arranged in two rows, namely, a front row and a rear row, in the first horizontal direction. The terminals 300 of each row are arranged in the second horizontal direction.

Figure 17:
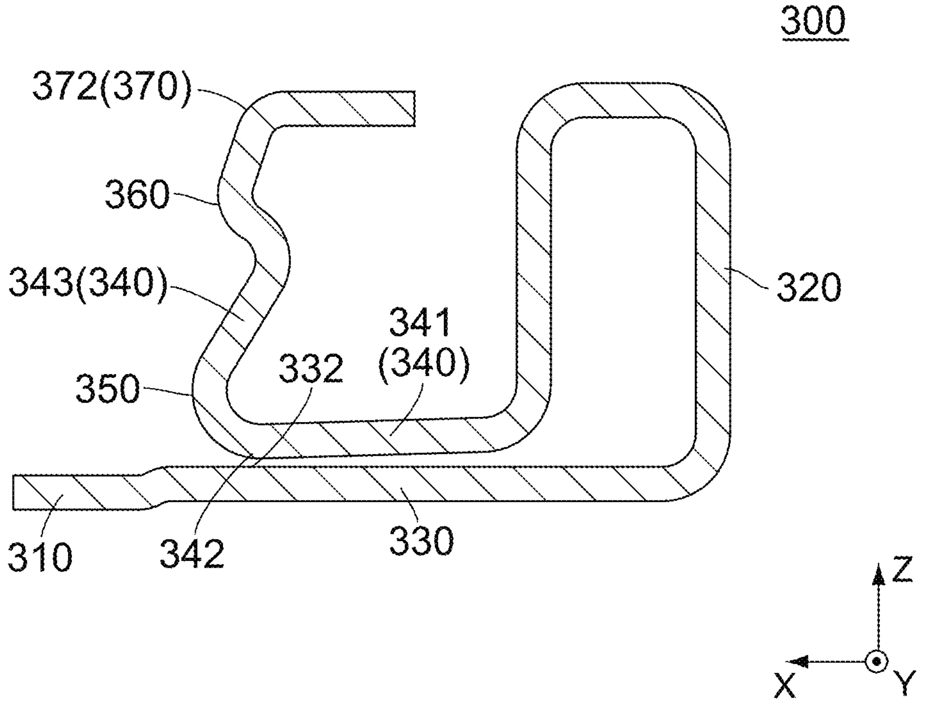
FIG. 17 is a cross-sectional view showing the terminal of FIG. 16, taken along line F-F.

As shown in FIG. 17, each of the terminals 300 of the present embodiment has a fixed portion 310, a held portion 320, a coupling portion 330, a supporting portion 340 and a contact point 360.

Referring to FIG. 17, in the first horizontal direction, the fixed portion 310 of the present embodiment extends outward from an outer end of the coupling portion 330. The fixed portion 310 defines a lower end of the terminal 300 in the up-down direction. The fixed portion 310 defines an outer end of the terminal 300 in the first horizontal direction. As shown in FIG. 14, the fixed portion 310 is configured to be fixed to the object 700.

As shown in FIG. 17, the held portion 320 of the present embodiment defines an inner end of the terminal 300 in the first horizontal direction. The held portion 320 extends upward in the up-down direction from the coupling portion 330. As shown in FIG. 4, the held portion 320 is held by the housing 200. Specifically, the held portion 320 is held by the holding portion 214. More specifically, the held portion 320 is press-fit into the holding portion 214.

Referring to FIG. 4, the coupling portion 330 of the present embodiment extends in a first orientation of the first horizontal direction from the held portion 320. The coupling portion 330 extends in a second orientation of the first horizontal direction from the fixed portion 310. In the present embodiment, the first orientation starting from the contact point 360 is away from the held portion 320 while the second orientation starting from the contact point 360 is toward the held portion 320. In other words, the first orientation is outward in the first horizontal direction while the second orientation is inward in the first horizontal direction. Specifically, in the terminal 300 of the front row, the first orientation is forward while the second orientation is rearward. Additionally, in the terminal 300 of the rear row, the first orientation is rearward while the second orientation is forward. The coupling portion 330 couples the fixed portion 310 and the held portion 320 with each other. The coupling portion 330 has a receiving portion 332.

As shown in FIG. 17, the receiving portion 332 of the present embodiment is positioned around an end portion of the coupling portion 330 in the first orientation. The receiving portion 332 is a surface facing upward in the up-down direction.

Referring to FIG. 3, the housing 200 does not have a bottom surface which is positioned just below the coupling portion 330. In other words, the coupling portion 330 is visible when the connector 100 is viewed from below in the up-down direction. This reduces a height of the connector 100 of the present embodiment in comparison with an assumption where the housing 200 have a bottom surface which is positioned just below the coupling portion 330.

As shown in FIG. 17, the supporting portion 340 of the present embodiment extends from the held portion 320. The supporting portion 340 is resiliently deformable. The supporting portion 340 has a first portion 341 and a second portion 343.

As shown in FIG. 17, the first portion 341 of the present embodiment defines an upper end of the supporting portion 340 in the up-down direction. The first portion 341 extends in the first orientation from the held portion 320 and is bent to extend downward and is further bent to extend in the first orientation and downward. The first portion 341 is away from the coupling portion 330 by a distance which is increased toward the held portion 320. The first portion 341 has an abutment portion 342. In other words, the supporting portion 340 has the abutment portion 342.

As shown in FIG. 17, the abutment portion 342 of the present embodiment is positioned at an end portion of the first portion 341 in the first orientation. The abutment portion 342 is positioned between the held portion 320 and the fixed portion 310 in the first horizontal direction. The abutment portion 342 is nearer to the contact point 360 than to the held portion 320 in the first horizontal direction perpendicular to the up-down direction. The abutment portion 342 is positioned above the receiving portion 332 in the up-down direction. In the up-down direction, the abutment portion 342 protrudes downward and defines the downwardmost position of the supporting portion 340. Since the supporting portion 340 is resiliently deformable as described above, the abutment portion 342 is movable downward in the up-down direction.

As shown in FIG. 4, the abutment portion 342 is positioned beyond the connection guiding surface 220 in the first orientation of the first horizontal direction under an unmated state where the connector 100 and the mating connector 500 are not mated with each other. The abutment portion 342 is not in contact with the receiving portion 332 under the unmated state where the connector 100 and the mating connector 500 are not mated with each other. In other words, the connector 100 has a gap GP between the abutment portion 342 and the receiving portion 332 under the unmated state where the connector 100 and the mating connector 500 are not mated with each other. Referring to FIGS. 4 and 14, the gap GP has a size smaller than a thickness of the object 700.

As shown in FIG. 11, the abutment portion 342 is in contact with the receiving portion 332 under a mated state where the connector 100 and the mating connector 500 are mated with each other. As described above, the receiving portion 332 is provided on the coupling portion 330 coupling the fixed portion 310, which is configured to be fixed to the object 700, with the held portion 320 held by the housing 200. Accordingly, a relative position of the receiving portion 332 in the terminal 300 is hardly changed. Thus, the abutment portion 342 can be reliably brought into contact with the receiving portion 332 when the connector 100 and the mating connector 500 are mated with each other.

As described above, the connector 100 has the gap GP, which is smaller than the thickness of the object 700, between the abutment portion 342 and the receiving portion 332 under the unmated state where the connector 100 and the mating connector 500 are not mated with each other. Accordingly, when the connector 100 and the mating connector 500 are mated with each other, the abutment portion 342 is brought into contact with the receiving portion 332 at an earlier period in the mating process and thereby a downward movement of the contact point 360 is prevented. In other words, the contact point 360 is moved by a short distance in the up-down direction when the connector 100 and the mating connector 500 are mated with each other. Thus, the connector assembly 600 of the present embodiment can have an increased effective contact length between the connector 100 and the mating connector 500. This can also reduce a size of the connector 100 in the up-down direction which is needed for the connector assembly 600 having a desired effective contact length. Thus, the connector assembly 600 can have a reduced height.

As shown in FIG. 17, the second portion 343 of the present embodiment extends upward in the up-down direction from the first portion 341. Specifically, the second portion 343 is bent from the first portion 341 and extends upward and toward the second orientation and is further bent to extend upward and toward the first orientation.

As shown in FIG. 17, the contact point 360 of the present embodiment is positioned at an upper end of the second portion 343. The contact point 360 is supported by the supporting portion 340. Referring to FIG. 4, the contact point 360 is movable in the first horizontal direction perpendicular to the up-down direction under the unmated state where the connector 100 and the mating connector 500 are not mated with each other. The contact point 360 faces in the first orientation of the first horizontal direction perpendicular to the up-down direction, wherein the first orientation starting from the contact point 360 is away from the held portion 320. Specifically, an orientation, in which the contact point 360 in an initial state should be moved, is the second orientation which is opposite to the first orientation. The contact point 360 is positioned beyond any of the connection guiding surfaces 220 in the first orientation under the unmated state where the connector 100 and the mating connector 500 are not mated with each other. As shown in FIG. 11, the contact point 360 is brought into contact with the mating terminal 530 under the mated state where the connector 100 and the mating connector 500 are mated with each other.

As shown in FIG. 17, the fixed portion 310, the held portion 320 and the contact point 360 are positioned on a common line parallel to the first horizontal direction. In other words, the fixed portion 310, the held portion 320 and the contact point 360 are positioned at the same location in the second horizontal direction.

As shown in FIG. 17, the terminal 300 further has a protruding portion 350.

As shown in FIG. 17, the protruding portion 350 of the present embodiment is formed on the supporting portion 340. More specifically, the protruding portion 350 is formed on the second portion 343. The protruding portion 350 is positioned beyond the contact point 360 in the first orientation of the first horizontal direction. The abutment portion 342 is positioned beyond the protruding portion 350 in the second orientation of the first horizontal direction. The receiving portion 332 is positioned beyond the protruding portion 350 in the second orientation of the first horizontal direction.

As shown in FIG. 4, the protruding portion 350 is bulged in the first orientation under the unmated state where the connector 100 and the mating connector 500 are not mated with each other. The protruding portion 350 is positioned beyond any of the connection guiding surfaces 220 in the first orientation under the unmated state where the connector 100 and the mating connector 500 are not mated with each other.

As shown in FIG. 17, the terminal 300 further has a guiding portion 370.

As shown in FIG. 17, the guiding portion 370 of the present embodiment is positioned above the contact point 360 in the up-down direction. The guiding portion 370 extends in the second orientation of the first horizontal direction and upward in the up-down direction, wherein the second orientation is opposite to the first orientation. As shown in FIG. 12, the two connection guiding surfaces 220 are positioned at opposite outsides, respectively, of the guiding portion 370 in the second horizontal direction which is perpendicular to both the up-down direction and the first horizontal direction. As shown in FIG. 17, the guiding portion 370 has a curved surface 372.

As shown in FIG. 17, the curved surface 372 of the present embodiment has an R-shape which is bulged upward and toward the first orientation. As shown in FIG. 4, the curved surface 372 is positioned at a location same as a location of the connection guiding surface 220 in the first horizontal direction.

Hereinafter, a detailed description will be made about a force applied to the terminal 300 upon the mating of the connector 100 with the mating connector 500 and a moment produced on the terminal 300 upon their mating.

First, the connector 100 and the mating connector 500 are arranged as shown in FIG. 4. In this state, the mating connector 500 is moved so that the connector 100 and the mating connector 500 approach each other in the up-down direction. Then, the mating terminal 530 is brought into contact with the guiding portion 370 of the terminal 300, and the mating of the connector 100 with the mating connector 500 begins.

Figure 7:
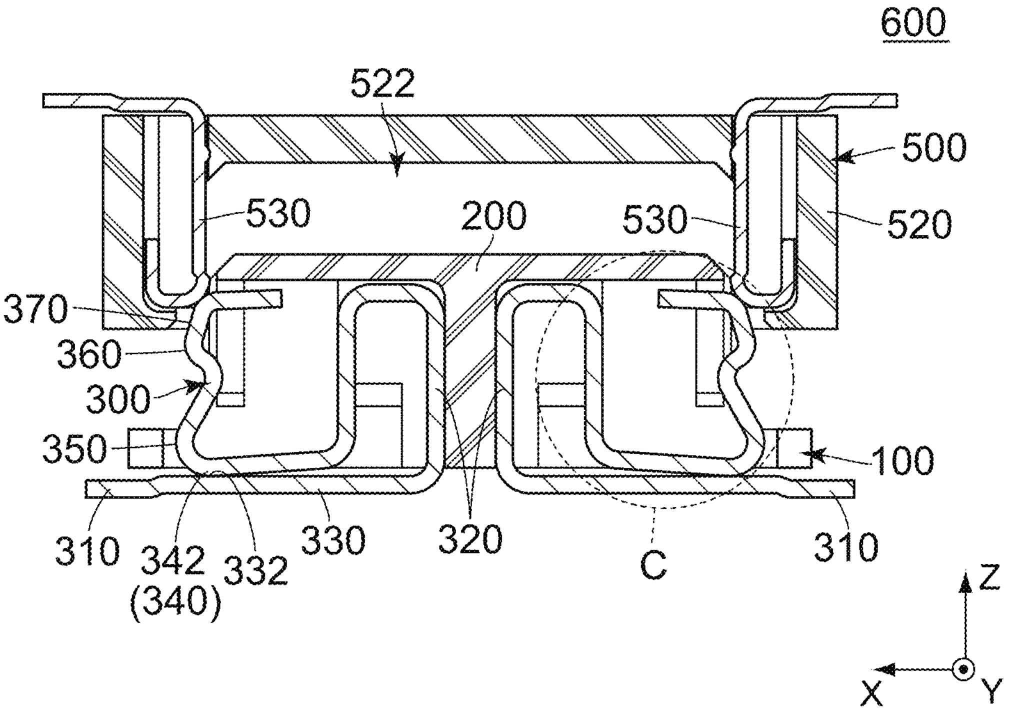
FIG. 7 is a cross-sectional view showing the connector assembly of FIG. 6, taken along line B-B.
Figure 8:
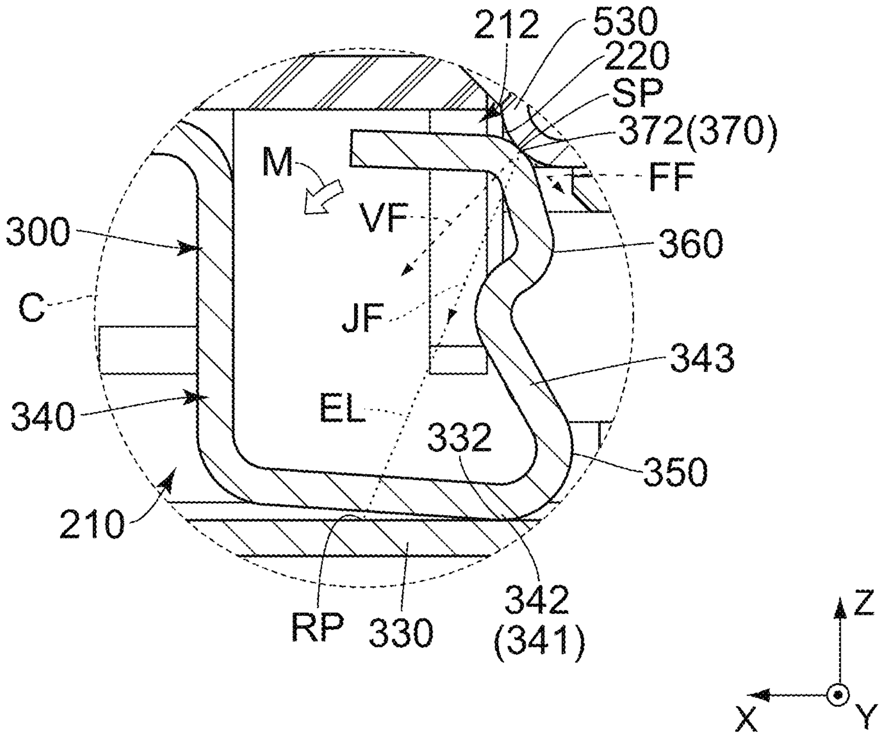
FIG. 8 is an enlarged view showing a part which is enclosed by dotted line C of FIG. 7.
Figure 9:
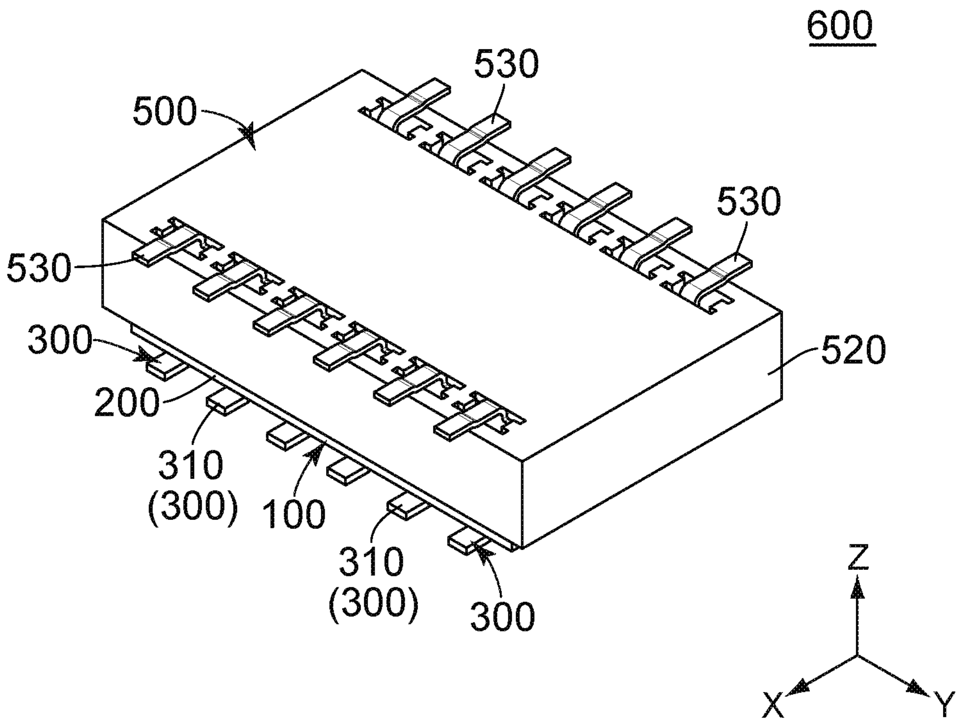
FIG. 9 is an upper, perspective view showing the connector assembly of FIG. 1. In the figure, the connector and the mating connector are in a mated state where the connector and the mating connector are mated with each other.
Figure 10:
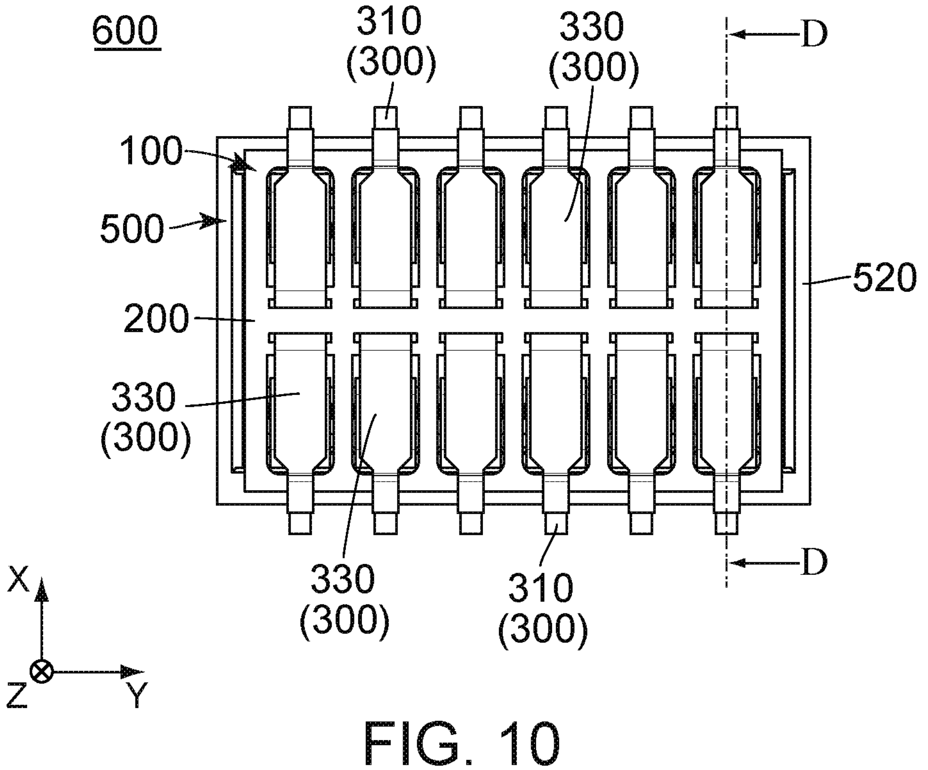
FIG. 10 is a bottom view showing the connector assembly of FIG. 9.

In this state, the mating connector 500 is further moved so that the connector 100 and the mating connector 500 further approach each other in the up-down direction. Then, the mating terminal 530 is moved on the guiding portion 370 while the mating terminal 530 pushes down the whole of the terminal 300, and the abutment portion 342 begins to be pressed against the receiving portion 332. Thus, the connector 100 and the mating connector 500 result in a specific contact state shown in each of FIGS. 7 and 8.

Under the specific contact state, the mating terminal 530 and the guiding portion 370 are in contact with each other at a specific contact location SP. At this time, the curved surface 372 of the guiding portion 370 of the terminal 300 is positioned at the specific contact location SP.

The aforementioned process is summarized as follows: in the middle of the process of mating the mating connector 500 and the connector 100 with each other, the mating terminal 530 is moved on the guiding portion 370 while the mating terminal 530 pushes down the whole of the terminal 300, and the abutment portion 342 begins to be pressed against the receiving portion 332; and the mating terminal 530 and the guiding portion 370 are brought into contact with each other at the specific contact location SP at the beginning of the abutment portion 342 being pressed against the receiving portion 332.

Under the specific contact state, the guiding portion 370 receives, from the mating terminal 530, a force which is directed perpendicular to a contact surface where the mating terminal 530 and the guiding portion 370 are in contact with each other. The force is referred to as a vertical force VF. In other words, at the specific contact location SP, the guiding portion 370 receives, from the mating terminal 530, the vertical force VF which is directed perpendicular to the contact surface where the mating terminal 530 and the guiding portion 370 are in contact with each other.

Under the specific contact state, the guiding portion 370 receives another force caused by friction between the mating terminal 530 and the guiding portion 370. The force is referred to as a frictional force FF. In other words, the guiding portion 370 receives, at the specific contact location SP, the frictional force FF caused by friction between the mating terminal 530 and the guiding portion 370 upon the movement of the mating terminal 530 on the guiding portion 370.

Summarizing the above, the guiding portion 370 receives a combined force JF of the vertical force VF and the frictional force FF under the specific contact state. An action line EL of the combined force JF intersects with the coupling portion 330 at a reference point RP.

Under the specific contact state, the abutment portion 342 is positioned beyond the reference point RP in the first orientation of the first horizontal direction.

As described above, under the specific contact state, the guiding portion 370 receives the combined force JF while the abutment portion 342 is positioned beyond the reference point RP in the first orientation. Accordingly, referring to FIG. 8, a moment M with respect to the abutment portion 342, which moves the guiding portion 370 in the second orientation, is produced at the specific contact location SP. In other words, the connector 100 of the present embodiment is configured so that the moment M with respect to the abutment portion 342 at the specific contact location SP is directed in the second orientation.

As described above, the orientation, in which the contact point 360 in the initial state should be moved, is the second orientation, and the moment M with respect to the abutment portion 342, which moves the guiding portion 370 in the second orientation, is produced at the specific contact location SP. Accordingly, the connector 100 of the present embodiment is configured so that the orientation, in which the contact point 360 in the initial state should be moved, coincides with the orientation of the moment M with respect to the abutment portion 342 at the specific contact location SP. Thus, the connector 100 of the present embodiment prevents an increase of a contact pressure between the mating terminal 530 and the terminal 300 upon the mating of the connector 100 with the mating connector 500. Consequently, the connector 100 of the present embodiment prevents buckling of the terminal 300 upon the mating of the connector 100 with the mating connector 500.

Second Embodiment

Figure 18:
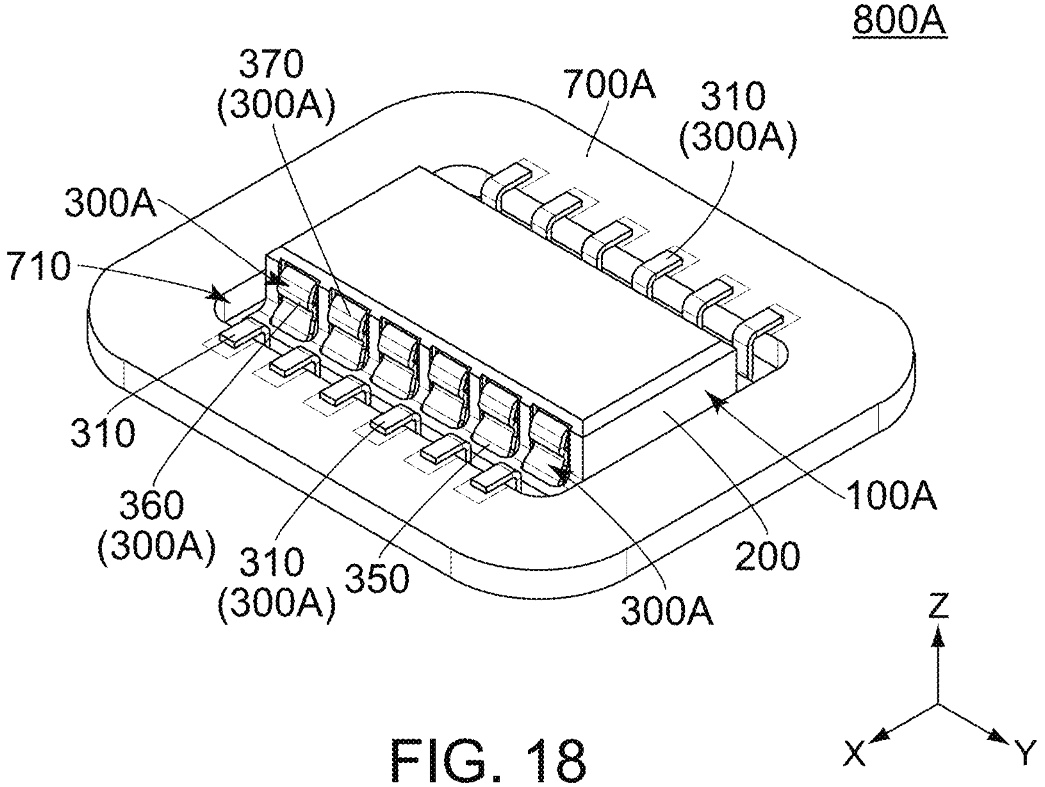
FIG. 18 is a perspective view showing an electronic equipment which consists of an object and a connector which is included in a connector assembly according to a second embodiment of the present invention. In the figure, the connector is mounted on the object.

Referring to FIG. 18, a connector assembly (not shown) according to a second embodiment of the present invention has a structure similar to that of the connector assembly 600 (see FIG. 1) of the aforementioned first embodiment. Accordingly, components similar to those of the first embodiment among components shown in FIGS. 18 to 20 will be designated by the same reference numerals as those of the first embodiment. As for directions and orientations in the present embodiment, expressions same as those of the first embodiment will be used hereinbelow.

Referring to FIG. 18, the connector assembly of the present embodiment comprises a mating connector (not shown) and a connector 100A which is configured to be mounted on an object 700A having an opening 710. The object 700A of the present embodiment is a circuit board. The connector 100A and the object 700A form an electronic equipment 800A. The mating connector of the present embodiment has a structure same as that of the mating connector 500 of the aforementioned first embodiment. Accordingly, a detailed explanation thereabout is omitted.

As shown in FIG. 18, the connector 100A of the present embodiment comprises a housing 200 and a plurality of terminals 300A. However, the present invention is not limited thereto. Specifically, the number of the terminal 300A may be one. The housing 200 has a structure same as that of the first embodiment. Accordingly, a detailed explanation thereabout is omitted.

Figure 19:
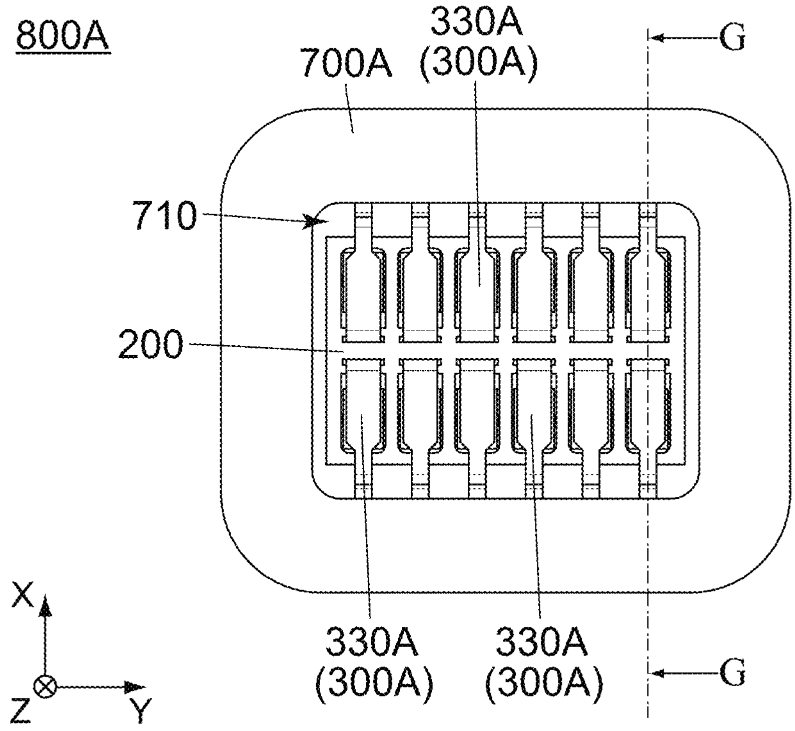
FIG. 19 is a bottom view showing the electronic equipment of FIG. 18.
Figure 20:
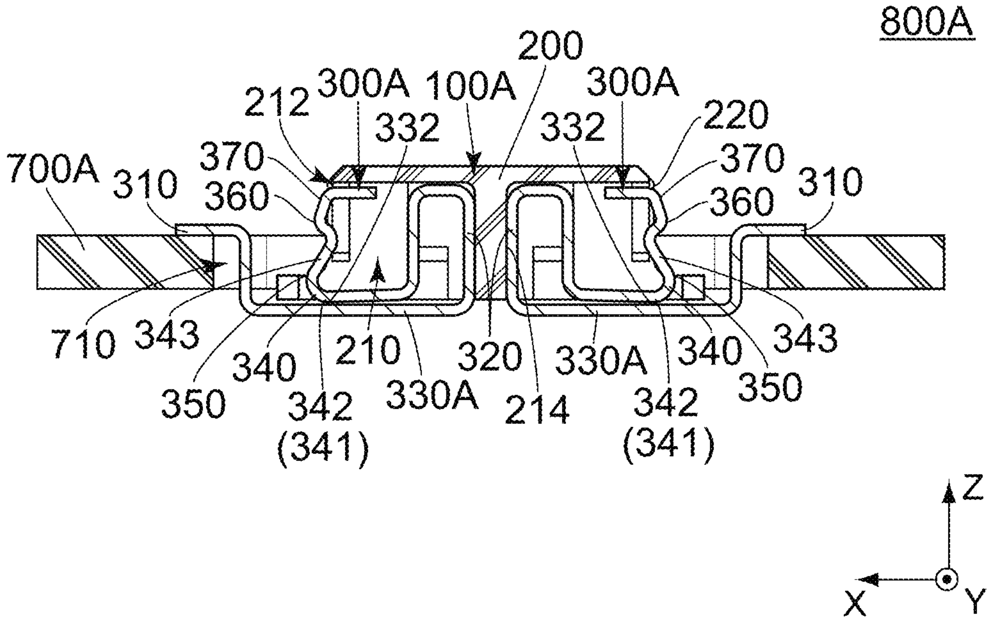
FIG. 20 is a cross-sectional view showing the electronic equipment of FIG. 19, taken along line G-G.

Referring to FIG. 20, each of the terminals 300A of the present embodiment is made of metal. As shown in FIG. 19, the terminals 300A are held by the housing 200. The terminals 300A are arranged in two rows, namely, a front row and a rear row, in the first horizontal direction. The terminals 300A of each row are arranged in the second horizontal direction.

As shown in FIG. 20, each of the terminals 300A has a fixed portion 310, a held portion 320, a coupling portion 330A, a supporting portion 340 and a contact point 360. The terminal 300A has a structure similar to that of the first embodiment except for the coupling portion 330A. Accordingly, a detailed explanation thereabout is omitted.

Referring to FIG. 20, the coupling portion 330A of the present embodiment extends in the first orientation of the first horizontal direction from the held portion 320. More specifically, the coupling portion 330A extends in the first orientation from the held portion 320 and is bent to extend upward and is further bent to extend toward the first orientation. The coupling portion 330A extends in the second orientation of the first horizontal direction from the fixed portion 310. More specifically, the coupling portion 330A extends in the second orientation from the fixed portion 310 and is bent to extend downward and is further bent to extend in the second orientation. The coupling portion 330A couples the fixed portion 310 and the held portion 320 with each other. The coupling portion 330A has a receiving portion 332.

As shown in FIG. 20, a part of the connector 100A is positioned in the opening 710 of the object 700A when the connector 100A of the present embodiment is mounted on the object 700A. In other words, the connector 100A of the present embodiment is a so-called drop-in connector. The connector 100A of the present embodiment is configured so that the fixed portion 310 is positioned above any of the receiving portion 332 and an abutment portion 342 in the up-down direction.

A force applied to the terminal 300A upon the mating of the connector 100A with the mating connector and a moment produced on the terminal 300A upon their mating are similar to those of the aforementioned first embodiment. Accordingly, a detailed explanation thereabout is omitted.

The connector assembly of the present embodiment also has an effect similar to that of the aforementioned first embodiment.

Third Embodiment

Figure 21:
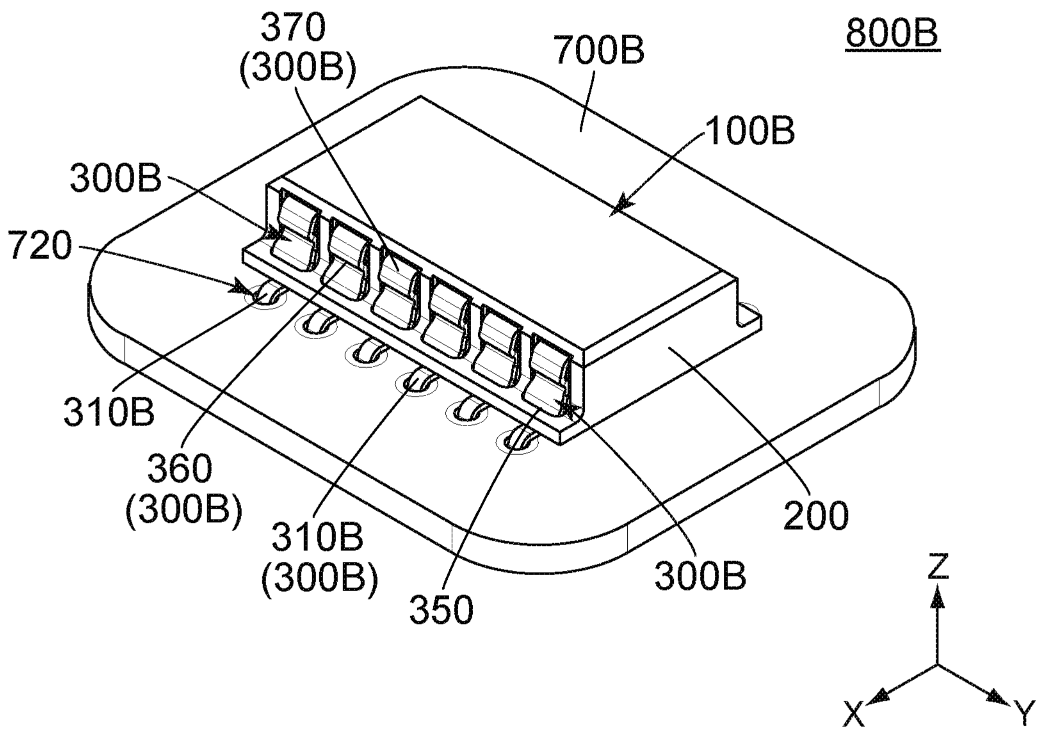
FIG. 21 is a perspective view showing an electronic equipment which consists of an object and a connector which is included in a connector assembly according to a third embodiment of the present invention. In the figure, the connector is mounted on the object.
Figure 22:
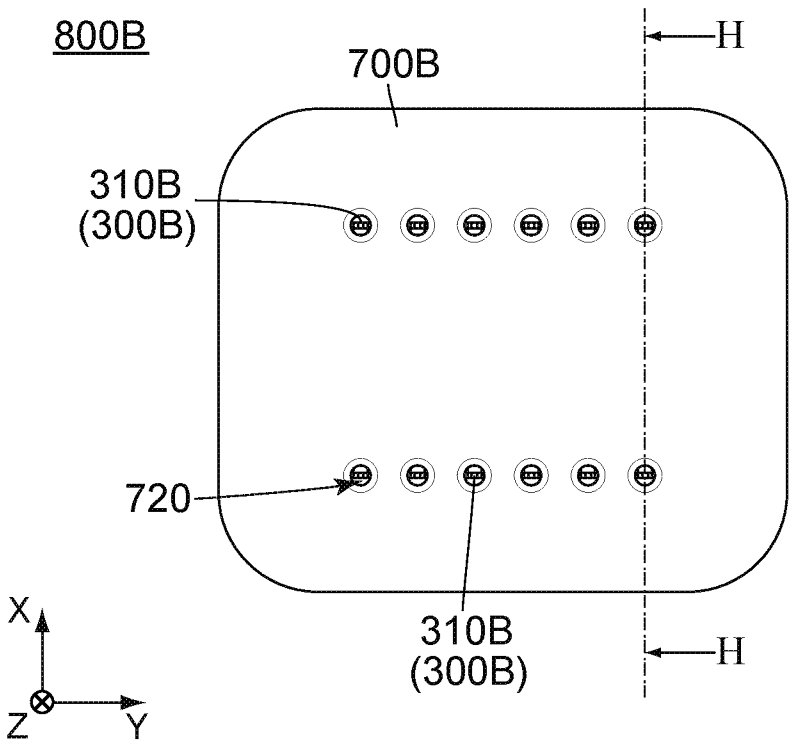
FIG. 22 is a bottom view showing the electronic equipment of FIG. 21.

Referring to FIG. 21, a connector assembly (not shown) according to a third embodiment of the present invention has a structure similar to that of the connector assembly 600 (see FIG. 1) of the aforementioned first embodiment. Accordingly, components similar to those of the first embodiment among components shown in FIGS. 21 to 23 will be designated by the same reference numerals as those of the first embodiment. As for directions and orientations in the present embodiment, expressions same as those of the first embodiment will be used hereinbelow.

Referring to FIG. 21, the connector assembly of the present embodiment comprises a mating connector (not shown) and a connector 1008 which is configured to be mounted on an object 700B having a plurality of through holes 720. The object 700B of the present embodiment is a circuit board. Each of the through holes 720 pierces the object 700B in the up-down direction. The connector 1008 and the object 700B form an electronic equipment 800B. The mating connector of the present embodiment has a structure same as that of the mating connector 500 of the aforementioned first embodiment. Accordingly, a detailed explanation thereabout is omitted.

Figure 23:
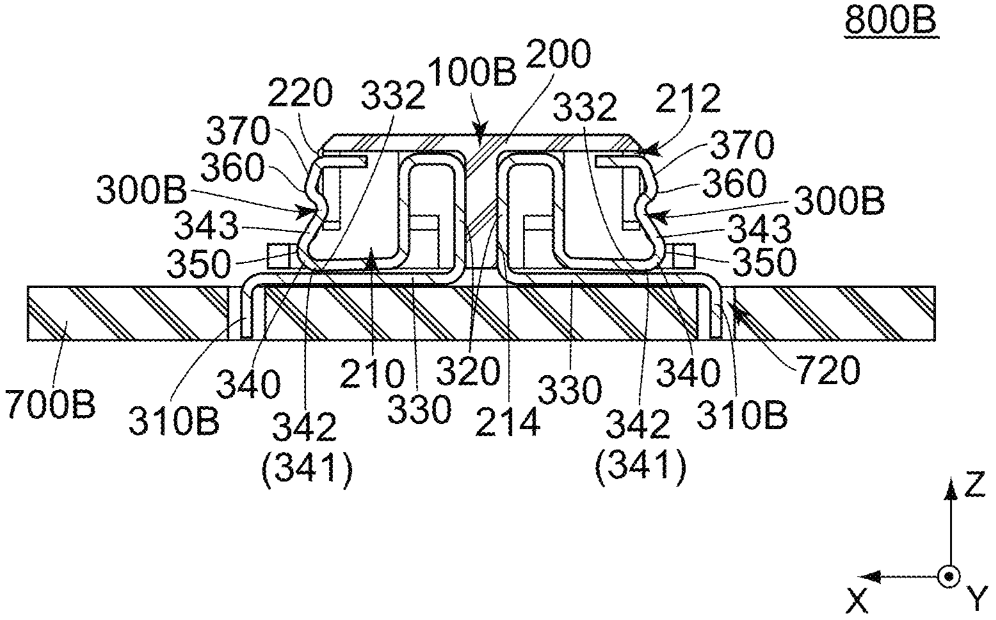
FIG. 23 is a cross-sectional view showing the electronic equipment of FIG. 22, taken along line H-H.

As shown in FIG. 23, the connector 1008 of the present embodiment comprises a housing 200 and a plurality of terminals 300B. However, the present invention is not limited thereto. Specifically, the number of the terminal 300B may be one. The housing 200 has a structure same as that of the first embodiment. Accordingly, a detailed explanation thereabout is omitted.

Referring to FIG. 23, each of the terminals 300B of the present embodiment is made of metal. The terminals 300B are held by the housing 200. The terminals 300B are arranged in two rows, namely, a front row and a rear row, in the first horizontal direction. The terminals 300B of each row are arranged in the second horizontal direction.

As shown in FIG. 23, each of the terminals 300B of the present embodiment has a fixed portion 3108, a held portion 320, a coupling portion 330, a supporting portion 340 and a contact point 360. The terminal 300B has a structure similar to that of the first embodiment except for the fixed portion 3108. Accordingly, a detailed explanation thereabout is omitted.

As shown in FIG. 23, the fixed portion 310B of the present embodiment extends downward in the up-down direction from an outer end of the coupling portion 330 in the first horizontal direction. The fixed portion 3108 defines a lower end of the terminal 300B in the up-down direction. The fixed portion 3108 defines an outer end of the terminal 300B in the first horizontal direction. The fixed portion 3108 is inserted into the through hole 720 of the object 700B to be fixed thereto when the connector 1008 is mounted on the object 700B.

A force applied to the terminal 300B upon the mating of the connector 100B with the mating connector and a moment produced on the terminal 300B upon their mating are similar to those of the aforementioned first embodiment. Accordingly, a detailed explanation thereabout is omitted.

The connector assembly of the present embodiment also has an effect similar to that of the aforementioned first embodiment.

Fourth Embodiment

Figure 24:
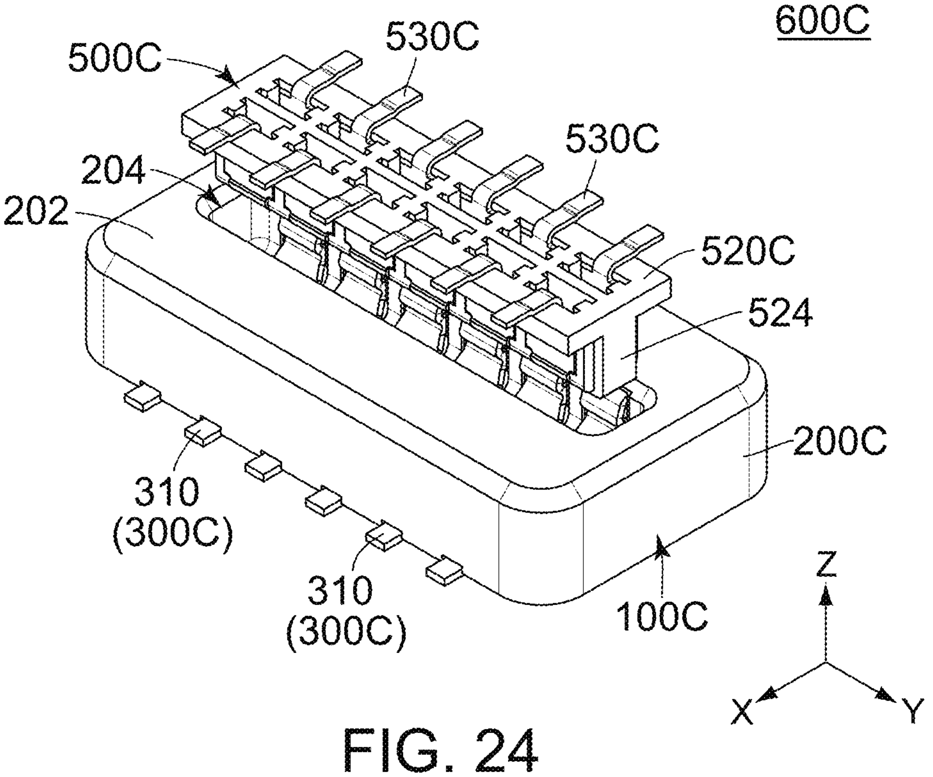
FIG. 24 is a perspective view showing a connector assembly according to a fourth embodiment of the present invention. In the figure, a connector and a mating connector are in an unmated state where the connector and the mating connector are not mated with each other.
Figure 27:
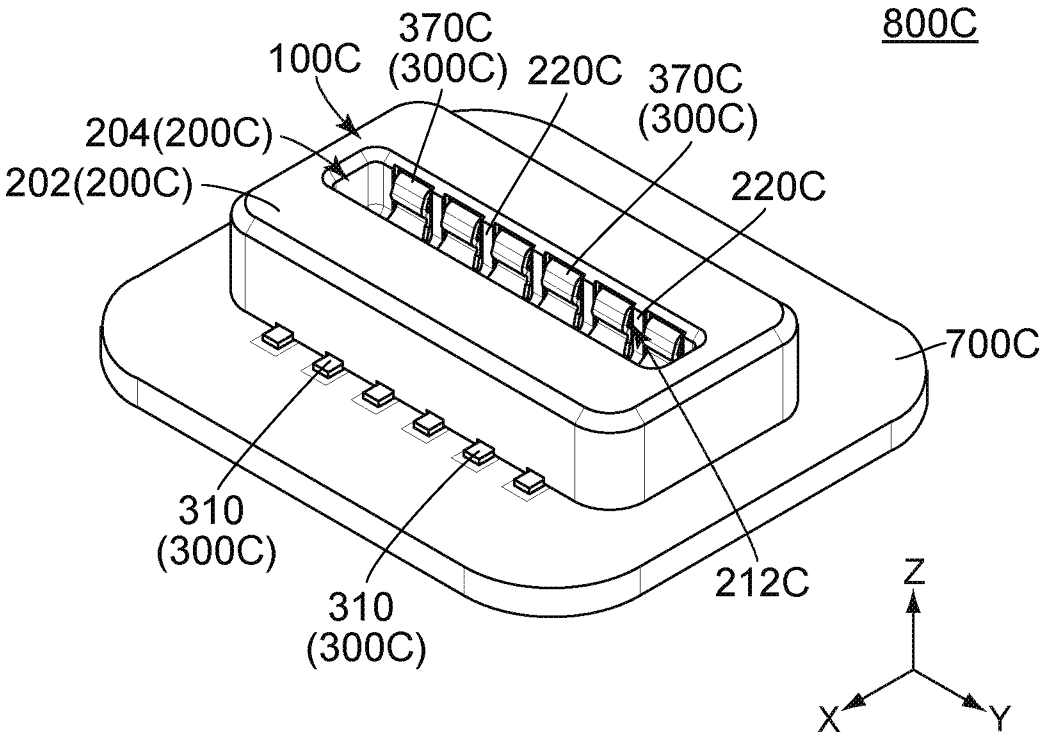
FIG. 27 is a perspective view showing an electronic equipment which consists of an object and a connector which is included in the connector assembly of FIG. 24. In the figure, the connector is mounted on the object.
Figure 28:
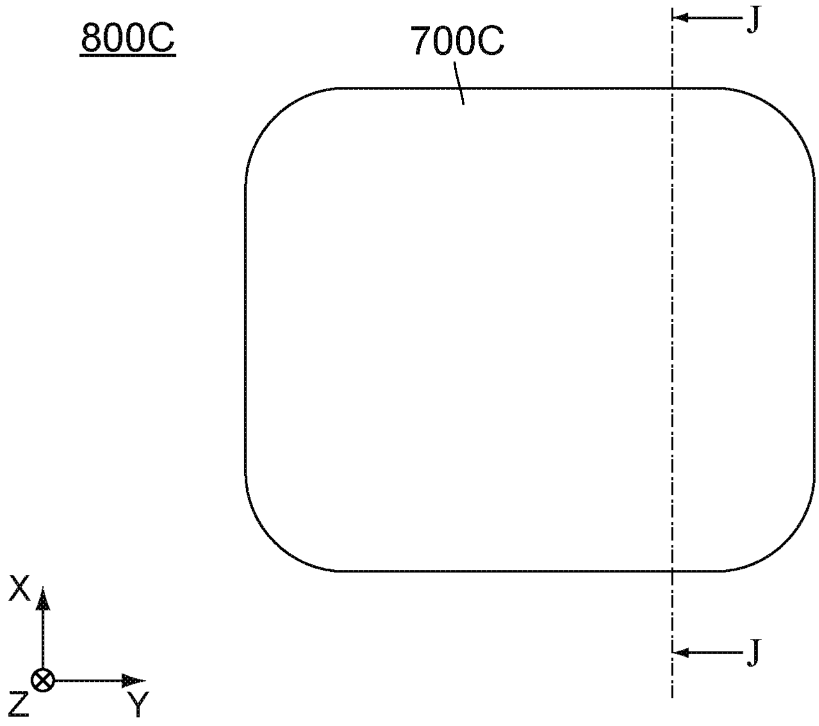
FIG. 28 is a bottom view showing the electronic equipment of FIG. 27.

As shown in FIGS. 24 and 27, a connector assembly 600C according to a fourth embodiment of the present invention comprises a mating connector 500C and a connector 100C which is configured to be mounted on an object 700C. The object 700C of the present embodiment is a circuit board. The connector 100C and the object 700C form an electronic equipment 800C.

Figure 26:
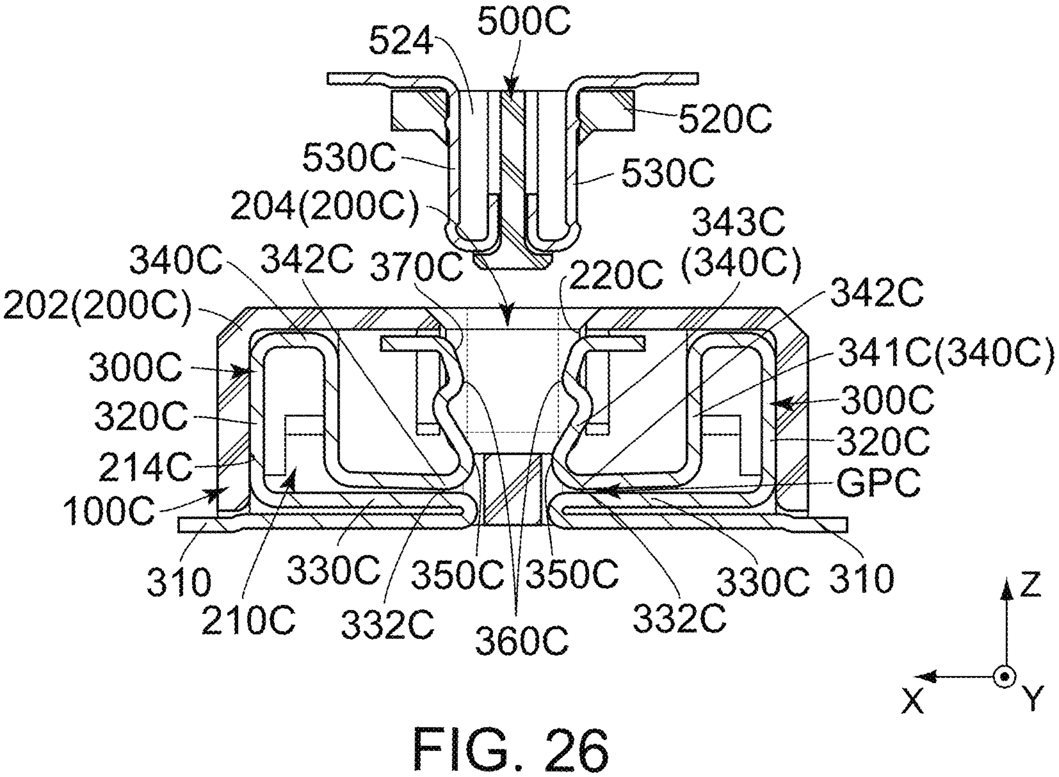
FIG. 26 is a cross-sectional view showing the connector assembly of FIG. 25, taken along line I-I.

Referring to FIG. 26, the mating connector 500C of the present embodiment is mateable from above with the connector 100C which is positioned below the mating connector 500C in an up-down direction. In the present embodiment, the up-down direction is a Z-direction. Specifically, upward is a positive Z-direction while downward is a negative Z-direction. The mating connector 500C comprises a mating housing 520C and a plurality of mating terminals 530C. However, the present invention is not limited thereto. Specifically, the number of the mating terminal 530C may be one.

Referring to FIG. 26, the mating housing 520C of the present embodiment is made of insulator. The mating housing 520C holds the mating terminals 530C. The mating housing 520C has an island-like portion 524. The island-like portion 524 extends downward in the up-down direction. The island-like portion 524 defines a lower end of the mating housing 520C in the up-down direction.

Referring to FIG. 26, each of the mating terminals 530C of the present embodiment is made of metal. As shown in FIG. 24, the mating terminals 530C are arranged in two rows in a first horizontal direction. In the present embodiment, the first horizontal direction is an X-direction. The first horizontal direction is also referred to as a front-rear direction. Specifically, it is assumed that forward is a positive X-direction while rearward is a negative X-direction. The mating terminals 530C of each row are arranged in a second horizontal direction. In the present embodiment, the second horizontal direction is a Y-direction. A part of each of the mating terminals 530C is exposed to the outside of the mating connector 500C from an outer end of the island-like portion 524 in the first horizontal direction.

As shown in FIG. 26, the connector 100C of the present embodiment comprises a housing 200C and a plurality of terminals 300C. However, the present invention is not limited thereto. Specifically, the number of the terminal 300C may be one.

Referring to FIG. 26, the housing 200C of the present embodiment is made of insulator. The housing 200C holds the terminals 300C. As shown in FIG. 27, the housing 200C has a surrounding portion 202 and a connector-side accommodating portion 204.

As shown in FIG. 27, the surrounding portion 202 of the present embodiment defines an outer end of the housing 200C in the first horizontal direction. The surrounding portion 202 defines an outer end of the housing 200C in the second horizontal direction. The surrounding portion 202 surrounds the connector-side accommodating portion 204 in a direction perpendicular to the up-down direction. As shown in FIGS. 26 and 27, the surrounding portion 202 has a plurality of terminal accommodating portions 210C and a plurality of connection guiding surfaces 220C. However, the present invention is not limited thereto. Specifically, the number of the connection guiding surfaces 220C may be two.

As shown in FIG. 26, each of the terminal accommodating portions 210C of the present embodiment opens downward in the up-down direction. Each of the terminal accommodating portions 210C communicates with the connector-side accommodating portion 204 in the first horizontal direction. Each of the terminal accommodating portions 210C opens inward in the first horizontal direction. As shown in FIGS. 26 and 27, each of the terminal accommodating portions 210C has an opening 212C which is positioned at its inner end in the first horizontal direction. As shown in FIG. 26, each of terminal accommodating portions 210C has a holding portion 214C. In other words, the housing 200C has a plurality of the holding portions 214C.

Referring to FIG. 26, the holding portion 214C of the present embodiment is a set of ditches which are positioned at opposite ends, respective, of the terminal accommodating portion 210C in the second horizontal direction.

As shown in FIG. 27, each of the connection guiding surfaces 220C of the present embodiment extends in a plane which is defined by the up-down direction and the second horizontal direction. Each of the connection guiding surfaces 220C is perpendicular to the first horizontal direction. Two of the connection guiding surfaces 220C are positioned at opposite sides, respectively, of the opening 212C in the second horizontal direction.

Figure 25:
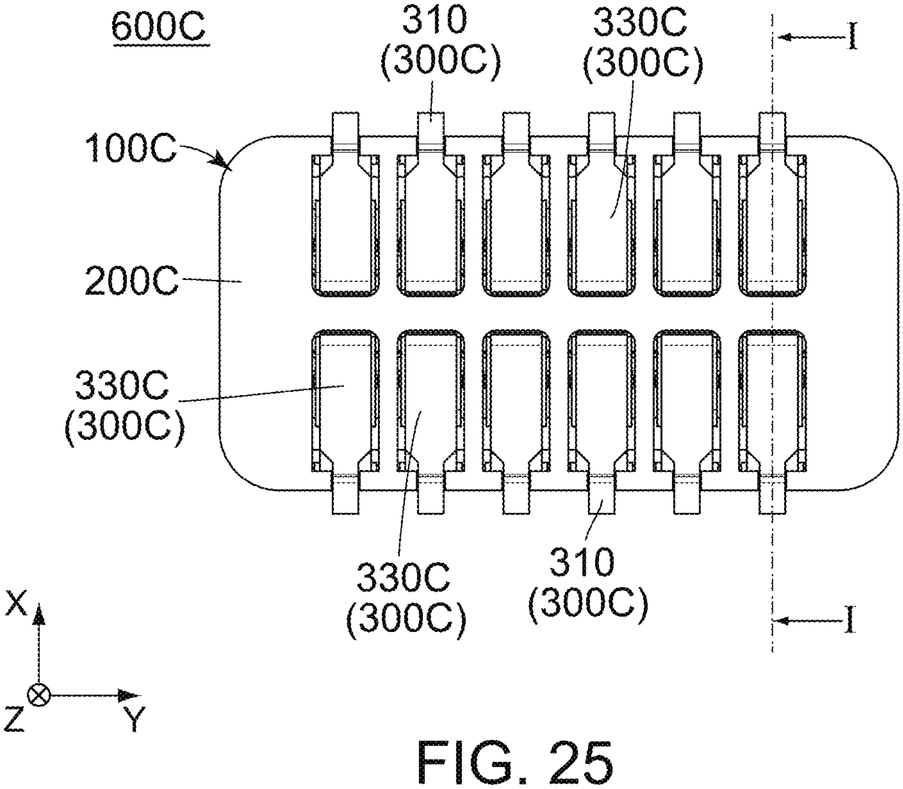
FIG. 25 is a bottom view showing the connector assembly of FIG. 24.

As shown in FIG. 26, the connector-side accommodating portion 204 of the present embodiment is a recess which is recessed downward in the up-down direction. A part of the mating connector 500C is accommodated in the connector-side accommodating portion 204 of the connector 100C when the connector 100C and the mating connector 500C are mated with each other. Specifically, the island-like portion 524 of the mating connector 500C is accommodated in the connector-side accommodating portion 204 of the connector 100C when the connector 100C and the mating connector 500C are mated with each other, Referring to FIG. 29, each of the terminals 300C of the present embodiment is made of metal. The terminals 300C are held by the housing 200C. As shown in FIG. 25, the terminals 300C are arranged in two rows, namely, a front row and a rear row, in the first horizontal direction. The terminals 300C of each row are arranged in the second horizontal direction.

Figure 29:
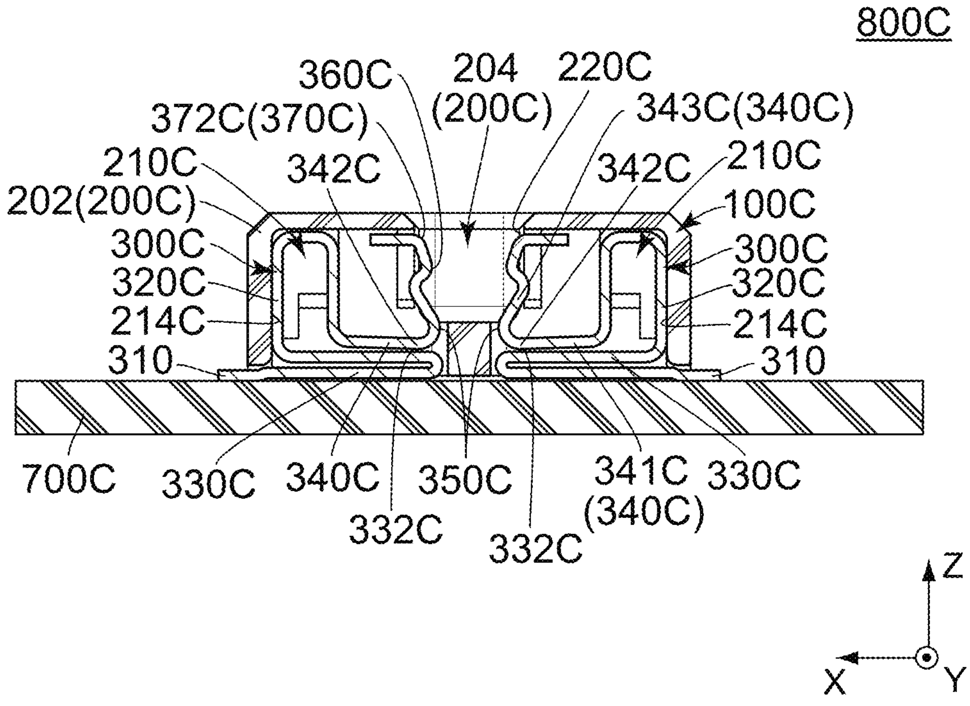
FIG. 29 is a cross-sectional view showing the electronic equipment of FIG. 28, taken along line J-J.

As shown in FIG. 29, each of the terminals 300C of the present embodiment has a fixed portion 310, a held portion 320C, a coupling portion 330C, a supporting portion 340C and a contact point 360C.

Referring to FIG. 29, the fixed portion 310 of the present embodiment is configured to be fixed to the object 700C. The fixed portion 310 has a structure same as that of the first embodiment. Accordingly, a detailed explanation thereabout is omitted.

As shown in FIG. 29, the held portion 320C of the present embodiment extends upward in the up-down direction from the coupling portion 330C. The held portion 320C is held by the housing 200C. Specifically, the held portion 320C is held by the holding portion 214C. More specifically, the held portion 320C is press-fit into the holding portion 214C.

Referring to FIG. 29, the coupling portion 330C of the present embodiment extends in a first orientation of the first horizontal direction from the held portion 320C and is bent to extend in a second orientation of the first horizontal direction. The coupling portion 330C extends in the first orientation of the first horizontal direction from the fixed portion 310 and is bent to extend in the second orientation of the first horizontal direction. In the present embodiment, the first orientation starting from the contact point 360C is away from the held portion 320C while the second orientation starting from the contact point 360C is toward the held portion 320C. In other words, the first orientation is inward in the first horizontal direction while the second orientation is outward in the first horizontal direction. Specifically, in the terminal 300C of the front row, the first orientation is rearward while the second orientation is forward. Additionally, in the terminal 300C of the rear row, the first orientation is forward while the second orientation is rearward. The coupling portion 330C couples the fixed portion 310 and the held portion 320C with each other. The coupling portion 330C has a receiving portion 332C.

As shown in FIG. 29, the receiving portion 332C of the present embodiment is positioned around an end portion of the coupling portion 330C in the first orientation. The receiving portion 332C is a surface facing upward in the up-down direction.

Referring to FIG. 25, the housing 200C does not have a bottom surface which is positioned just below the coupling portion 330C. In other words, the coupling portion 330C is visible when the connector 100C is viewed from below in the up-down direction. This reduces a height of the connector 100C of the present embodiment in comparison with an assumption where the housing 200C have a bottom surface which is positioned just below the coupling portion 330C.

As shown in FIG. 29, the supporting portion 340C of the present embodiment extends from the held portion 320C. The supporting portion 340C is resiliently deformable. The supporting portion 340C has a first portion 341C and a second portion 343C.

As shown in FIG. 29, the first portion 341C of the present embodiment defines an upper end of the supporting portion 340C in the up-down direction. The first portion 341C extends in the first orientation from the held portion 320C and is bent to extend downward and is further bent to extend in the first orientation and downward. The first portion 341C is away from the coupling portion 330C by a distance which is increased toward the held portion 320C. The first portion 341C has an abutment portion 342C. In other words, the supporting portion 340C has the abutment portion 342C.

As shown in FIG. 29, the abutment portion 342C of the present embodiment is positioned at an end portion of the first portion 341C in the first orientation. The abutment portion 342C is nearer to the contact point 360C than to the held portion 320C in the first horizontal direction perpendicular to the up-down direction. The abutment portion 342C is positioned above the receiving portion 332C in the up-down direction. In the up-down direction, the abutment portion 342C protrudes downward and defines the downward-most position of the supporting portion 340C. Since the supporting portion 340C is resiliently deformable as described above, the abutment portion 342C is movable downward in the up-down direction.

As shown in FIG. 26, the abutment portion 342C is positioned beyond the connection guiding surface 220C in the first orientation of the first horizontal direction under an unmated state where the connector 100C and the mating connector 500C are not mated with each other. The abutment portion 342C is not in contact with the receiving portion 332C under the unmated state where the connector 100 and the mating connector 500 are not mated with each other. In other words, the connector 100C has a gap GPC between the abutment portion 342C and the receiving portion 332C under the unmated state where the connector 100 and the mating connector 500 are not mated with each other. Referring to FIGS. 26 and 29, the gap GPC has a size smaller than a thickness of the object 700C.

Referring to FIG. 26, the abutment portion 342C is in contact with the receiving portion 332C under a mated state where the connector 100C and the mating connector 500C are mated with each other. As described above, the receiving portion 332C is provided on the coupling portion 330C coupling the fixed portion 310, which is configured to be fixed to the object 700C, with the held portion 320C held by the housing 200C. Accordingly, a relative position of the receiving portion 332C in the terminal 300C is hardly changed. Thus, the abutment portion 342C can be reliably brought into contact with the receiving portion 332C when the connector 100C and the mating connector 500C are mated with each other.

As described above, the connector 100C has the gap GPC, which is smaller than the thickness of the object 700C, between the abutment portion 342C and the receiving portion 332C under the unmated state where the connector 100 and the mating connector 500 are not mated with each other. Accordingly, when the connector 100C and the mating connector 500C are mated with each other, the abutment portion 342C is brought into contact with the receiving portion 332C at an earlier period in the mating process and thereby a downward movement of the contact point 360C is prevented. In other words, the contact point 360C is moved by a short distance in the up-down direction when the connector 100C and the mating connector 500C are mated with each other. Thus, the connector assembly 600C of the present embodiment can have an increased effective contact length between the connector 100C and the mating connector 500C.

As shown in FIG. 26, the second portion 343C of the present embodiment extends upward in the up-down direction from the first portion 341C. Specifically, the second portion 343C is bent from the first portion 341C and extends upward and toward the second orientation and is further bent to extend upward and toward the first orientation.

As shown in FIG. 26, the contact point 360C of the present embodiment is positioned at an upper end of the second portion 343C. The contact point 360C is supported by the supporting portion 340C. The contact point 360C is movable in the first horizontal direction perpendicular to the up-down direction under the unmated state where the connector 100C and the mating connector 500C are not mated with each other. The contact point 360C faces in the first orientation of the first horizontal direction perpendicular to the up-down direction, wherein the first orientation starting from the contact point 360C is away from the held portion 320C. Specifically, an orientation, in which the contact point 360C in an initial state should be moved, is the second orientation which is opposite to the first orientation. The contact point 360C is positioned beyond any of the connection guiding surfaces 220C in the first orientation under the unmated state where the connector 100C and the mating connector 500C are not mated with each other. The contact point 360C is brought into contact with the mating terminal 530C under the mated state where the connector 100C and the mating connector 500C are mated with each other.

As shown in FIG. 29, the fixed portion 310, the held portion 320C and the contact point 360C are positioned on a common line parallel to the first horizontal direction. In other words, the fixed portion 310, the held portion 320C and the contact point 360C are positioned at the same location in the second horizontal direction.

As shown in FIG. 29, the terminal 300C further has a protruding portion 350C.

As shown in FIG. 29, the protruding portion 350C of the present embodiment is formed on the supporting portion 340C. More specifically, the protruding portion 350C is formed on the second portion 343C. The protruding portion 350C is positioned beyond the contact point 360C in the first orientation of the first horizontal direction. The abutment portion 342C is positioned beyond the protruding portion 350C in the second orientation of the first horizontal direction. The receiving portion 332C is positioned beyond the protruding portion 350C in the second orientation of the first horizontal direction.

As shown in FIG. 26, the protruding portion 350C is bulged in the first orientation under the unmated state where the connector 100C and the mating connector 500C are not mated with each other. The protruding portion 350C is positioned beyond any of the connection guiding surfaces 220C in the first orientation under the unmated state where the connector 100C and the mating connector 500C are not mated with each other.

As shown in FIG. 29, the terminal 300C further has a guiding portion 370C.

As shown in FIG. 29, the guiding portion 370C of the present embodiment is positioned above the contact point 360C in the up-down direction. The guiding portion 370C extends in the second orientation of the first horizontal direction and upward in the up-down direction, wherein the second orientation is opposite to the first orientation. As shown in FIG. 27, the two connection guiding surfaces 220C are positioned at opposite outsides, respectively, of the guiding portion 370C in the second horizontal direction which is perpendicular to both the up-down direction and the first horizontal direction. As shown in FIG. 29, the guiding portion 370C has a curved surface 372C.

As shown in FIG. 29, the curved surface 372C of the present embodiment has an R-shape which is bulged upward and toward the first orientation. The curved surface 372C is positioned at a location same as a location of the connection guiding surface 220C in the first horizontal direction.

A force applied to the terminal 300C upon the mating of the connector 100C with the mating connector 500C and a moment produced on the terminal 300C upon their mating are substantially similar to those of the first embodiment. Accordingly, a detailed explanation thereabout is omitted.

The connector assembly 600C of the present embodiment also has an effect similar to that of the aforementioned first embodiment.

The configurations of the terminals 300, 300A, 300B, 300C of the connectors 100, 100A, 1008, 100C are not limited thereto and may be modified as follows.

Figure 30:
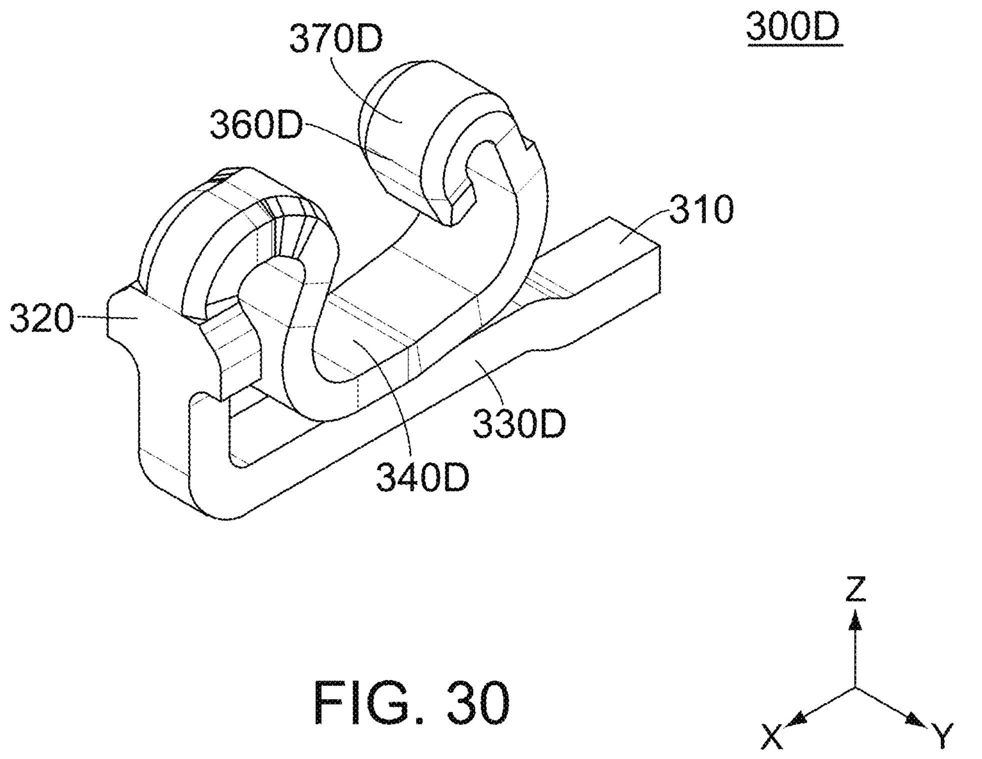
FIG. 30 is a perspective view showing a terminal of a modification.
Figure 31:
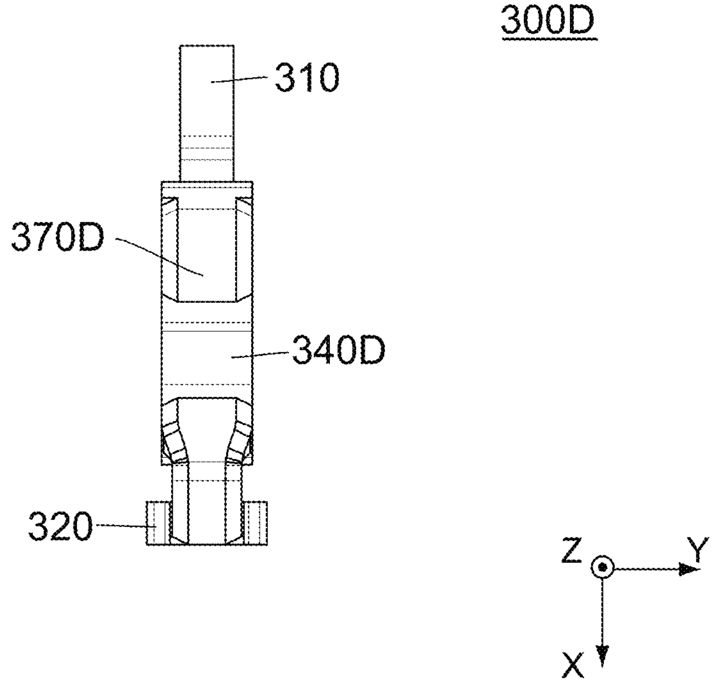
FIG. 31 is a top view showing the terminal of FIG. 30.
Figure 32:
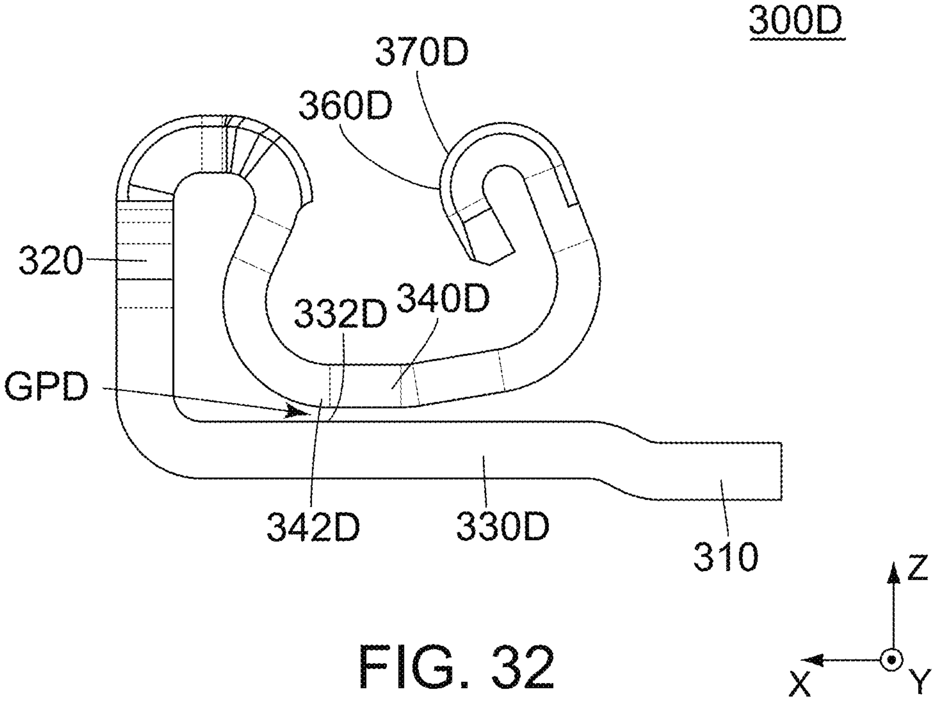
FIG. 32 is a side view showing the terminal of FIG. 30.
Figure 33:
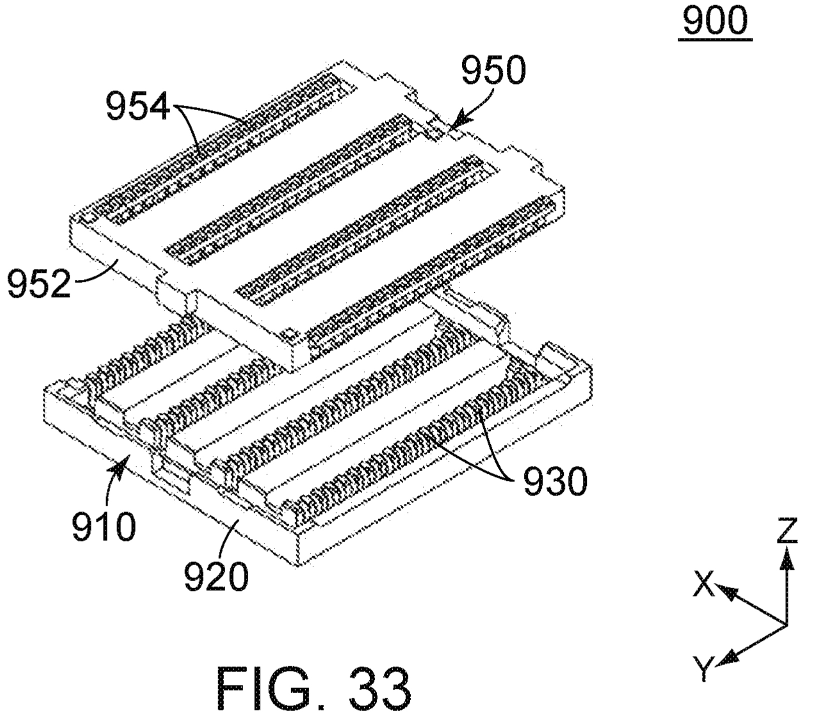
FIG. 33 PRIOR ART
FIG. 33 is a perspective view showing a connector assembly of Patent Document 1.
Figure 34:
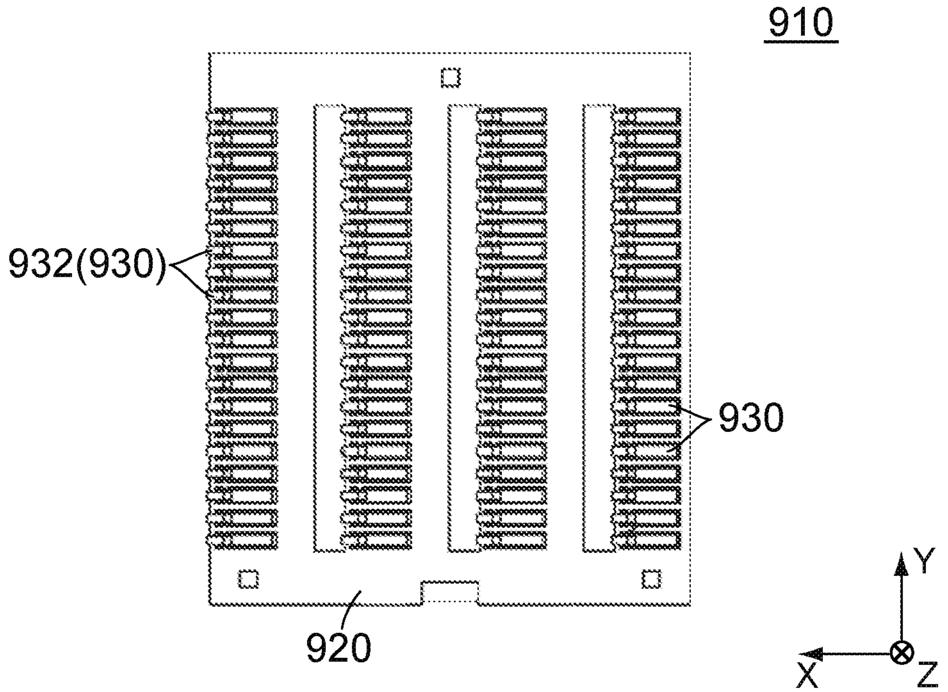
FIG. 34 PRIOR ART
FIG. 34 is a bottom view showing a connector which is included in the connector assembly of FIG. 33.
Figure 35:
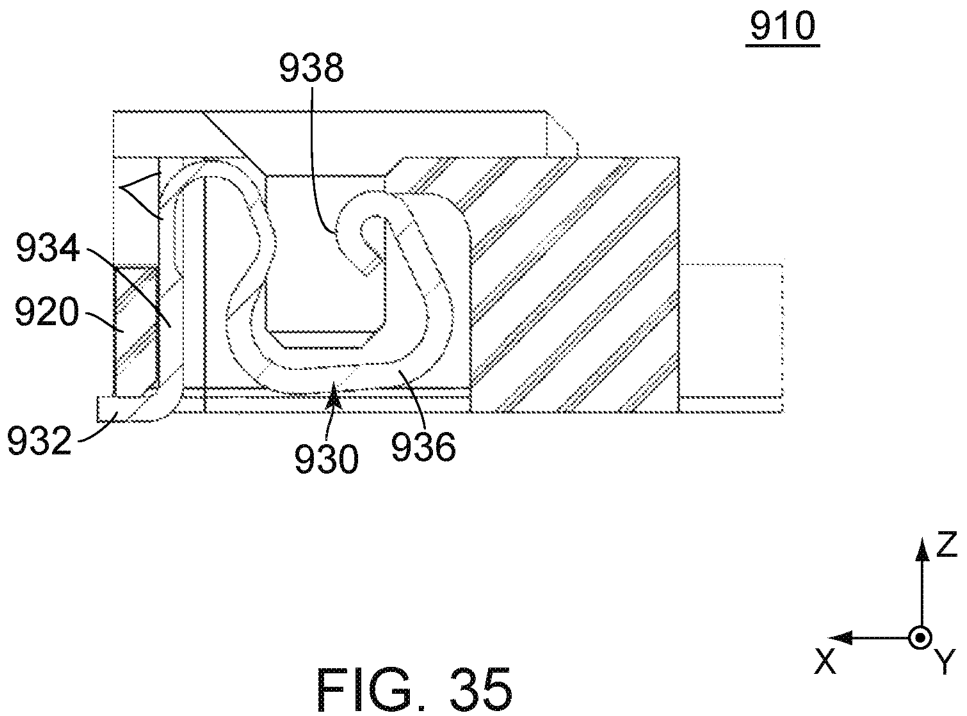
FIG. 35 PRIOR ART
FIG. 35 is an enlarged, cross-sectional view showing a part of the connector of FIG. 34.

Referring to FIGS. 30 to 32, a terminal 300D of a modification has a fixed portion 310, a held portion 320, a coupling portion 330D, a supporting portion 340D and a contact point 360D. The fixed portion 310 and the held portion 320 of the present modification have structures similar to those of the fixed portion 310 and the held portion 320 of the terminal 300 of the aforementioned embodiment. Accordingly, a detailed explanation thereabout is omitted.

As shown in FIG. 32, the coupling portion 330D of the present modification extends from the fixed portion 310 to the held portion 320. The coupling portion 330D couples the fixed portion 310 and the held portion 320 with each other. The coupling portion 330D has a receiving portion 332D.

As shown in FIG. 32, the receiving portion 332D of the present modification is a surface facing upward in the up-down direction. The receiving portion 332D is provided on the coupling portion 330D coupling the fixed portion 310, which is configured to be fixed to an object (not shown), with the held portion 320 held by a housing (not shown).

As shown in FIG. 32, the supporting portion 340D of the present modification extends from the held portion 320. The supporting portion 340D is resiliently deformable. The supporting portion 340D has an abutment portion 342D.

As shown in FIG. 32, the abutment portion 342D of the present modification is positioned between the held portion 320 and the fixed portion 310 in the first horizontal direction. The abutment portion 342D is positioned above the receiving portion 332D in the up-down direction. In the up-down direction, the abutment portion 342D protrudes downward and defines the downward-most position of the supporting portion 340D. Since the supporting portion 340D is resiliently deformable as described above, the abutment portion 342D is movable downward in the up-down direction.

Referring to FIG. 32, the abutment portion 342D is not in contact with the receiving portion 332D under an unmated state where a connector (not shown), which comprises the terminals 300D, and a mating connector (not shown) are not mated with each other. In other words, the connector has a gap GPD between the abutment portion 342D and the receiving portion 332D under the unmated state where the connector, which comprises the terminals 300D, and the mating connector are not mated with each other.

Referring to FIG. 32, the abutment portion 342D is in contact with the receiving portion 332D under a mated state where the connector, which comprises the terminals 300D, and the mating connector are mated with each other. As described above, the receiving portion 332D is provided on the coupling portion 330D coupling the fixed portion 310, which is configured to be fixed to the object (not shown), with the held portion 320 held by the housing (not shown). Accordingly, a relative position of the receiving portion 332D in the terminal 300D is hardly changed. Thus, the abutment portion 342D can be reliably brought into contact with the receiving portion 332D when the connector, which comprises the terminals 300D, and the mating connector are mated with each other.

As shown in FIG. 32, the contact point 360D of the present modification is supported by the supporting portion 340D. The contact point 360D is movable in the first horizontal direction perpendicular to the up-down direction under the unmated state where the connector, which comprises the terminals 300D, and the mating connector are not mated with each other. The contact point 360D faces in the second orientation of the first horizontal direction perpendicular to the up-down direction, wherein the second orientation starting from the contact point 360D is toward the held portion 320. Specifically, an orientation, in which the contact point 360D in an initial state should be moved, is the first orientation which is opposite to the second orientation. The contact point 360D is brought into contact with a mating terminal (not shown) under the mated state where the connector, which comprises the terminals 300D, and the mating connector are mated with each other.

As shown in FIG. 32, the terminal 300D further has a guiding portion 370D.

As shown in FIG. 32, the guiding portion 370D of the present modification is positioned above the contact point 360D in the up-down direction. The guiding portion 370D extends in the first orientation of the first horizontal direction and upward in the up-down direction.

Although the specific explanation about the present invention is made above referring to the embodiments, the present invention is not limited thereto and is susceptible to various modifications and alternative forms.

In the aforementioned embodiments, the abutment portion 342, 342C is positioned beyond the connection guiding surface 220, 220C in the first orientation of the first horizontal direction under the unmated state where the connector 100, 100A, 1008, 100C and the mating connector 500, 500C are not mated with each other. However, the present invention is not limited thereto. Specifically, the abutment portion 342, 342C may be positioned at a location same as a location of the connection guiding surface 220, 220C in the first horizontal direction under the unmated state where the connector 100, 100A, 1008, 100C and the mating connector 500, 500C are not mated with each other. In other words, the connector 100, 100A, 1008, 100C should be configured so that, under the unmated state where the connector 100, 100A, 1008, 100C and the mating connector 500, 500C are not mated with each other, the abutment portion 342, 342C is positioned at the location same as the location of the connection guiding surface 220, 220C in the first horizontal direction or beyond the connection guiding surface 220, 220C in the first orientation of the first horizontal direction. This enables the abutment portion 342, 342C to be brought into contact with the receiving portion 332, 332C at a relatively earlier timing in the middle of the process of mating the connector 100, 100A, 1008, 100C and the mating connector 500, 500C with each other so that a desired moment M is produced at the specific contact location SP of the terminal 300, 300A, 300B, 300C. Thus, the connector 100, 100A, 1008, 100C can reliably prevent buckling of the terminal 300, 300A, 300B, 300C upon the mating of the connector 100, 100A, 1008, 100C with the mating connector 500, 500C.

In the aforementioned embodiments, the protruding portion 350, 350C is bulged in the first orientation under the unmated state where the connector 100, 100A, 1008, 100C and the mating connector 500, 500C are not mated with each other. However, the present invention is not limited thereto. Specifically, the protruding portion 350, 350C may protrude in the first orientation under the unmated state where the connector 100, 100A, 1008, 100C and the mating connector 500, 500C are not mated with each other. In other words, the protruding portion 350, 350C should be configured so that, under the unmated state where the connector 100, 100A, 1008, 100C and the mating connector 500, 500C are not mated with each other, the protruding portion 350, 350C protrudes in the first orientation or is bulged in the first orientation. This facilitates the second portion 343, 343C of the terminal 300, 300A, 300B, 300C, which is pushed down by the mating terminal 530, 530C, to be tilted in the second orientation upon the mating of the connector 100, 100A, 1008, 100C with the mating connector 500, 500C. Thus, the connector 100, 100A, 1008, 100C can further prevent buckling of the terminal 300, 300A, 300B, 300C upon the mating of the connector 100, 100A, 1008, 100C with the mating connector 500, 500C.

Although each of the coupling portions 330, 330A, 330C of the terminals 300, 300A, 300B, 300C of the aforementioned embodiments has no portion which is press-fit into the housing 200, 200C, the present invention is not limited thereto. Specifically, the terminal 300, 300A, 300B, 300C may be modified as follows: instead of having the fixed portion 310, 3108, the terminal 300, 300A, 300B, 300C has a fixed portion 310, 3108 which is positioned outward in the first horizontal direction beyond the original location of the fixed portion 310, 3108; and the coupling portion 330, 330A, 330C has a press-fit portion which is press-fit into the housing 200, 200C. In this case, the receiving portion 332, 332C is positioned between the aforementioned press-fit portion and the held portion 320, 320C in the first horizontal direction.

Although the electronic equipment 800, 800A, 800B, 800C comprises the object 700, 700A, 700B, 700C, which is the circuit board, and the connector 100, 100A, 100B, 100C of the connector assembly 600, 600C which is mounted on the circuit board, the present invention is not limited thereto. Specifically, the electronic equipment 800, 800A, 800B, 800C may, for example, be modified as follows: the housing 200, 200C of the connector 100, 100A, 100B, 100C functions as a floating housing; the object 700, 700A, 700B, 700C functions as a fixed housing; and the connector 100, 100A, 100B, 100C is mounted on the fixed housing. In other words, the electronic equipment 800, 800A, 800B, 800C may be modified to function as a floating connector. That is, the present invention is also applicable to a floating connector.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector assembly comprising a mating connector and a connector which is configured to be mounted on an object, wherein:

the mating connector is mateable from above with the connector which is positioned below the mating connector in an up-down direction;

the mating connector comprises a mating housing and a mating terminal;

the mating housing holds the mating terminal;

the connector comprises a housing and a terminal;

the housing holds the terminal;

the terminal has a fixed portion, a held portion, a coupling portion, a supporting portion and a contact point;

the fixed portion is configured to be fixed to the object;

the held portion is held by the housing;

the coupling portion couples the fixed portion and the held portion with each other;

the coupling portion has a receiving portion;

the supporting portion extends from the held portion and is resiliently deformable;

the supporting portion has an abutment portion;

the abutment portion is positioned above the receiving portion in the up-down direction;

the abutment portion is in contact with the receiving portion under a mated state where the connector and the mating connector are mated with each other;

the contact point is supported by the supporting portion;

the contact point is brought into contact with the mating terminal under the mated state;

the contact point is movable in a first horizontal direction perpendicular to the up-down direction under an unmated state where the connector and the mating connector are not mated with each other; and the abutment portion is positioned between the held portion and the fixed portion in the first horizontal direction.

2. The connector assembly as recited in claim 1, wherein the coupling portion is visible when the connector is viewed from below in the up-down direction.

3. A connector assembly comprising a mating connector and a connector which is configured to be mounted on an object, wherein:

the mating connector is mateable from above with the connector which is positioned below the mating connector in an up-down direction;

the mating connector comprises a mating housing and a mating terminal;

the mating housing holds the mating terminal;

the connector comprises a housing and a terminal;

the housing holds the terminal;

the terminal has a fixed portion, a held portion, a coupling portion, a supporting portion and a contact point;

the fixed portion is configured to be fixed to the object;

the held portion is held by the housing;

the coupling portion couples the fixed portion and the held portion with each other;

the coupling portion has a receiving portion;

the supporting portion extends from the held portion and is resiliently deformable;

the supporting portion has an abutment portion;

the abutment portion is positioned above the receiving portion in the up-down direction;

the abutment portion is in contact with the receiving portion under a mated state where the connector and the mating connector are mated with each other;

the contact point is supported by the supporting portion;

the contact point is brought into contact with the mating terminal under the mated state;

the contact point faces in a first orientation of a first horizontal direction which is perpendicular to the up-down direction;

the first orientation starting from the contact point is away from the held portion;

the terminal further has a protruding portion;

the protruding portion is formed on the supporting portion; and under an unmated state where the connector and the mating connector are not mated with each other, the protruding portion protrudes in the first orientation or is bulged in the first orientation.

4. The connector assembly as recited in claim 3, wherein:

the terminal further has a guiding portion;

the guiding portion is positioned above the contact point in the up-down direction;

the guiding portion extends in a second orientation of the first horizontal direction and upward in the up-down direction;

the second orientation is opposite to the first orientation;

in a middle of a process of mating the mating connector and the connector with each other, the mating terminal is moved on the guiding portion while the mating terminal pushes down a whole of the terminal and the abutment portion begins to be pressed against the receiving portion;

the mating terminal and the guiding portion are brought into contact with each other at a specific contact location at the beginning of the abutment portion being pressed against the receiving portion;

the guiding portion receives a vertical force from the mating terminal at the specific contact location;

the vertical force is directed perpendicular to a contact surface where the mating terminal and the guiding portion are in contact with each other at the specific contact location;

the guiding portion receives, at the specific contact location, a frictional force caused by friction between the mating terminal and the guiding portion upon movement of the mating terminal on the guiding portion;

an action line of a combined force of the vertical force and the frictional force intersects with the coupling portion at a reference point; and the abutment portion is positioned beyond the reference point in the first orientation of the first horizontal direction.

5. The connector assembly as recited in claim 1, wherein:

the connector has a gap between the abutment portion and the receiving portion under an unmated state where the connector and the mating connector are not mated with each other; and the gap has a size smaller than a thickness of the object.

6. The connector assembly as recited in claim 1, wherein the abutment portion is nearer to the contact point than to the held portion in a first horizontal direction perpendicular to the up-down direction.

* * * * *